US012719620B2

(12) United States Patent
Yuan et al.

(10) Patent No.: US 12,719,620 B2
(45) Date of Patent: Aug. 25, 2026

(54) USER EQUIPMENT COOPERATION

(71) Applicant: QUALCOMM Incorporated, San Diego, CA (US)

(72) Inventors: Fang Yuan, Beijing (CN); Mostafa Khoshnevisan, San Diego, CA (US); Aleksandar Damnjanovic, Del Mar, CA (US); Jing Sun, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 477 days.

(21) Appl. No.: 18/026,788

(22) PCT Filed: Nov. 25, 2020

(86) PCT No.: PCT/CN2020/131343

§ 371 (c)(1),
(2) Date: Mar. 16, 2023

(87) PCT Pub. No.: WO2022/109836

PCT Pub. Date: Jun. 2, 2022

(65) Prior Publication Data

US 2023/0403715 A1 Dec. 14, 2023

(51) Int. Cl.
*H04W 72/232* (2023.01)
*H04B 7/0404* (2017.01)
(Continued)

(52) U.S. Cl.
CPC ......... *H04L 1/1858* (2013.01); *H04B 7/0404* (2013.01); *H04L 1/1896* (2013.01);
(Continued)

(58) Field of Classification Search
CPC .. H04B 7/0404; H04B 7/0667; H04B 7/0673; H04W 72/232; H04W 72/1273; H04L 5/0053; H04L 1/1896; H04L 1/1858
See application file for complete search history.

(56) References Cited

U.S. PATENT DOCUMENTS 12,114,313 B2 * 10/2024 Choi ..................... H04W 72/21
2010/0322350 A1 * 12/2010 Malladi ................ H04B 7/0491
375/299

(Continued)

FOREIGN PATENT DOCUMENTS

CN 105594139 A 5/2016
CN 111149306 A 5/2020

(Continued)

OTHER PUBLICATIONS

International Search Report and Written Opinion—PCT/CN2020/131343—ISA/EPO—Jul. 26, 2021.

(Continued)

*Primary Examiner* — Redentor Pasia
(74) *Attorney, Agent, or Firm* — QUALCOMM Incorporated

(57) ABSTRACT

Aspects presented herein may improve the accuracy and/or the efficiency of HARQ feedback for a UE communicating with a base station or multiple TRPs using multiple antenna panels. In one aspect, an apparatus receives DCI scheduling a PDSCH to be received by a first plurality of panels and indicating a second plurality of PUCCH repetitions for providing ACK/NACK feedback. The apparatus receives the PDSCH through the first plurality of panels. The apparatus transmits ACK/NACK feedback in the indicated second plurality of PUCCH repetitions based on the received PDSCH.

25 Claims, 16 Drawing Sheets

(51) Int. Cl.
*H04L 1/1829* (2023.01)
*H04L 1/1867* (2023.01)
*H04L 5/00* (2006.01)
*H04W 72/1273* (2023.01)

(52) U.S. Cl.
CPC ....... *H04L 5/0053* (2013.01); *H04W 72/1273* (2013.01); *H04W 72/232* (2023.01)

(56) References Cited

U.S. PATENT DOCUMENTS

| | | | | |
|---|---|---|---|---|
| 2017/0272220 | A1* | 9/2017 | Chen | H04B 7/0413 |
| 2019/0364561 | A1* | 11/2019 | Xiong | H04W 76/27 |
| 2020/0205150 | A1* | 6/2020 | Cheng | H04W 72/21 |
| 2021/0203397 | A1* | 7/2021 | Xiong | H04W 72/046 |
| 2022/0030443 | A1* | 1/2022 | Chen | H04W 72/21 |
| 2022/0030606 | A1* | 1/2022 | Xiong | H04W 72/1268 |
| 2022/0095235 | A1* | 3/2022 | Zhang | H04W 72/20 |
| 2022/0304038 | A1* | 9/2022 | Zhang | H04B 7/088 |
| 2023/0077264 | A1* | 3/2023 | Gao | H04L 5/0053 |
| 2023/0147122 | A1* | 5/2023 | Canonne-Velasquez | H04L 5/005 370/329 |
| 2025/0105983 | A1* | 3/2025 | Liu | H04L 1/1864 |

FOREIGN PATENT DOCUMENTS

| | | | |
|---|---|---|---|
| WO | 2020033549 | A1 | 2/2020 |
| WO | 2020061171 | | 3/2020 |

OTHER PUBLICATIONS

NTT Docomo, Inc: "Enhancements on Multi-TRP/Panel Transmission", 3GPP TSG RAN WG1 #97, R1-1906224, 3rd Generation Partnership Project, Mobile Competence Centre, 650, Route Des Lucioles, F-06921Sophia-Antipolis Cedex, France, vol. RAN WG1, No. Reno, USA, May 13, 2019-May 17, 2019, May 13, 2019, 32 Pages, XP051727678, p. 19, Paragraph 3.1.1—p. 21, Paragraph 3 .1. 2, Last Two Agreements, p. 2 Last Two Agreements, p. 3 Proposal 2-3, p. 6 p. 7 Proposal 2-4, p. 8 Proposal 2-11, p. 12, paragraph [0002]-paragraph [0003].

NTT Docomo, Inc: "Enhancements on Multi-TRP/Panel Transmission", 3GPP TSG RAN WG1 Meeting #95, R1-1813333, Spokane, USA, Nov. 12-16, 2018, pp. 1-20, The whole document.

Spreadtrum Communications: "Discussion on Enhancements on Multi-TRP for PDCCH, PUCCH and PUSCH", 3GPP TSG RAN WG1 #102-e, R1-2006258, e-Meeting, Aug. 17-28, 2020, 5 Pages, The whole document.

* cited by examiner

804

832

PDSCH 818

830

DCI 816

PUCCH (Repetition 1) 820

PUCCH (Repetition 2) 822

PUCCH (Repetition 3) 824

PUCCH (Repetition M) 826

802

814 PN

812 P3

810 P2

808 P1

834

1004

1032

PDSCH 1018

1030

DCI 1016

PUCCH (Repetition 1) 1020

PUCCH (Repetition 2) 1022

PUCCH (Repetition 3) 1024

PUCCH (Repetition N) 1026

1002

1014

1012

1010

1008

P1

P2

P3

PN $K_1 + O_1$ $K_1 + O_2$ $K_1 + O_3$ $K_1 + O_N$

1034

1000

1104

1132

PDSCH 1118

1130

DCI 1116

PUCCH (Repetition 1) 1120

PUCCH (Repetition 2) 1122

PUCCH (Repetition 3) 1124

PUCCH (Repetition N) 1126

1102

1108 P1

1110 P2

1112 P3

1114 PN

Selected $K_1$

Selected $K_1$

Selected $K_1$

Selected $K_1$

1134

USER EQUIPMENT COOPERATION

CROSS REFERENCE TO RELATED APPLICATION(S)

This application is a National Stage Application filed under 35 U.S.C. § 371 of PCT International Application No. PCT/CN2020/131343, entitled "USER EQUIPMENT COOPERATION" filed Nov. 25, 2020, which is incorporated herein by reference in its entirety.

BACKGROUND

Technical Field

The present disclosure relates generally to communication systems, and more particularly, to user equipment (UE) cooperation in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may receive downlink control information (DCI) scheduling a physical downlink shared channel (PDSCH) to be received by a first plurality of panels and indicating a second plurality of physical uplink control channel (PUCCH) repetitions for providing acknowledgment (ACK)/negative ACK (NACK) feedback. The apparatus may also receive the PDSCH through the first plurality of panels. The apparatus may also transmit ACK/NACK feedback in the indicated second plurality of PUCCH repetitions based on the received PDSCH.

In an aspect of the disclosure, a method, a computer-readable medium, and an apparatus are provided for wireless communication at a base station. The apparatus may transmit, to a UE, DCI scheduling a PDSCH to be transmitted to a first plurality of panels and indicating a second plurality of PUCCH repetitions for receiving ACK/NACK feedback. The apparatus may also transmit the PDSCH to the first plurality of panels. The apparatus may also receive ACK/NACK feedback in the indicated second plurality of PUCCH repetitions based on the transmitted PDSCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
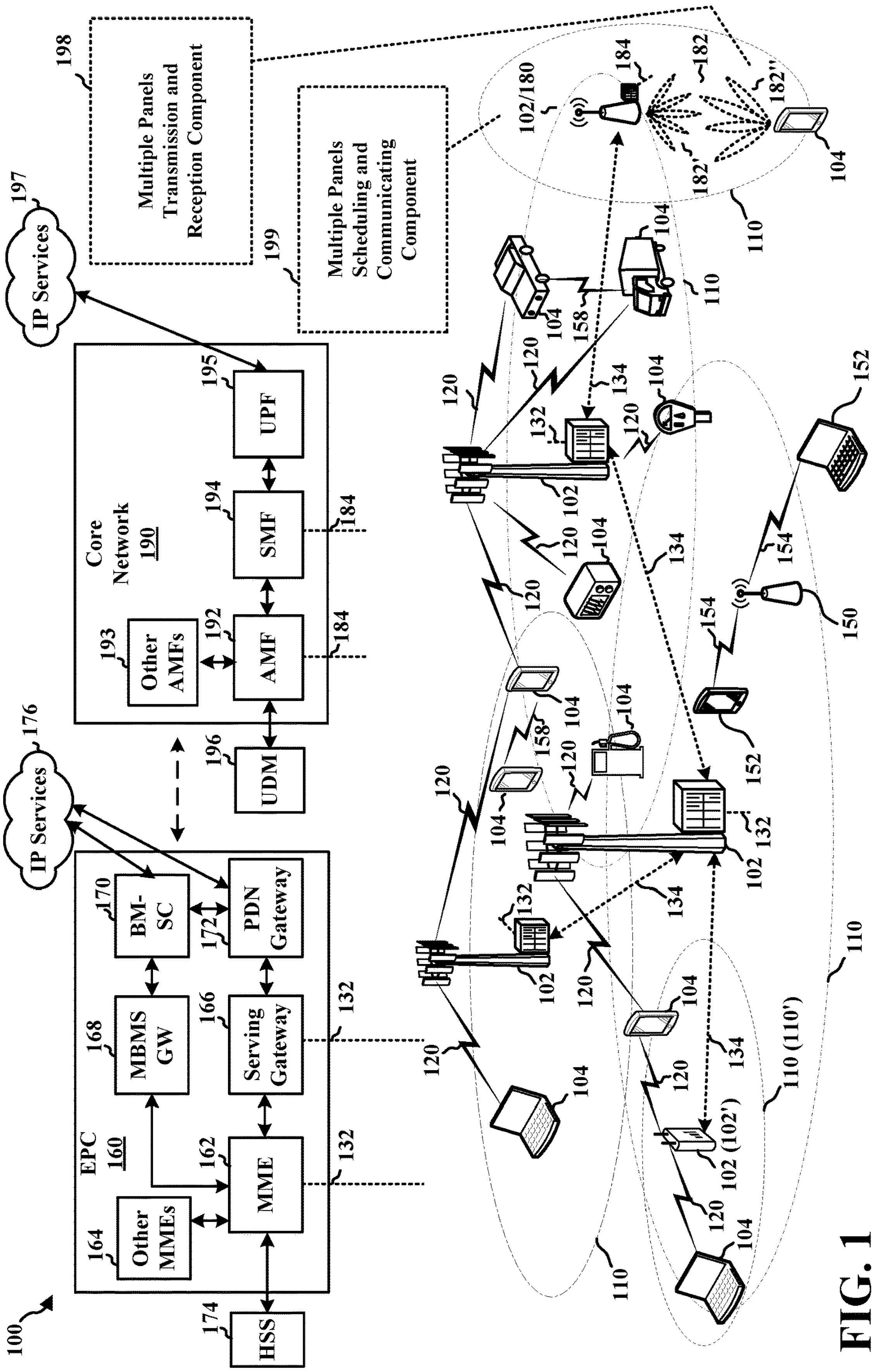
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to include a multiple panels transmission and reception component 198. In certain aspects, the base station 180 may be configured to include a multiple panels scheduling and communicating component 199. In one aspect, the multiple panels transmission and reception component 198 may be configured to receive DCI scheduling a PDSCH to be received by a first plurality of panels and indicating a second plurality of PUCCH repetitions for providing ACK/NACK feedback. The multiple panels transmission and reception component 198 may be configured to receive the PDSCH through the first plurality of panels. The multiple panels transmission and reception component 198 may be configured to transmit ACK/NACK feedback in the indicated second plurality of PUCCH repetitions based on the received PDSCH. In one aspect, the multiple panels scheduling and communicating component 199 may be configured to transmit, to a UE, DCI scheduling a PDSCH to be transmitted to a first plurality of panels and indicating a second plurality of PUCCH repetitions for receiving ACK/NACK feedback. The multiple panels scheduling and communicating component 199 may be configured to transmit the PDSCH to the first plurality of panels. The multiple panels scheduling and communicating component 199 may be configured to receive ACK/NACK feedback in the indicated second plurality of PUCCH repetitions based on the transmitted PDSCH.

Figures 2A, 2B, 2C, 2D:
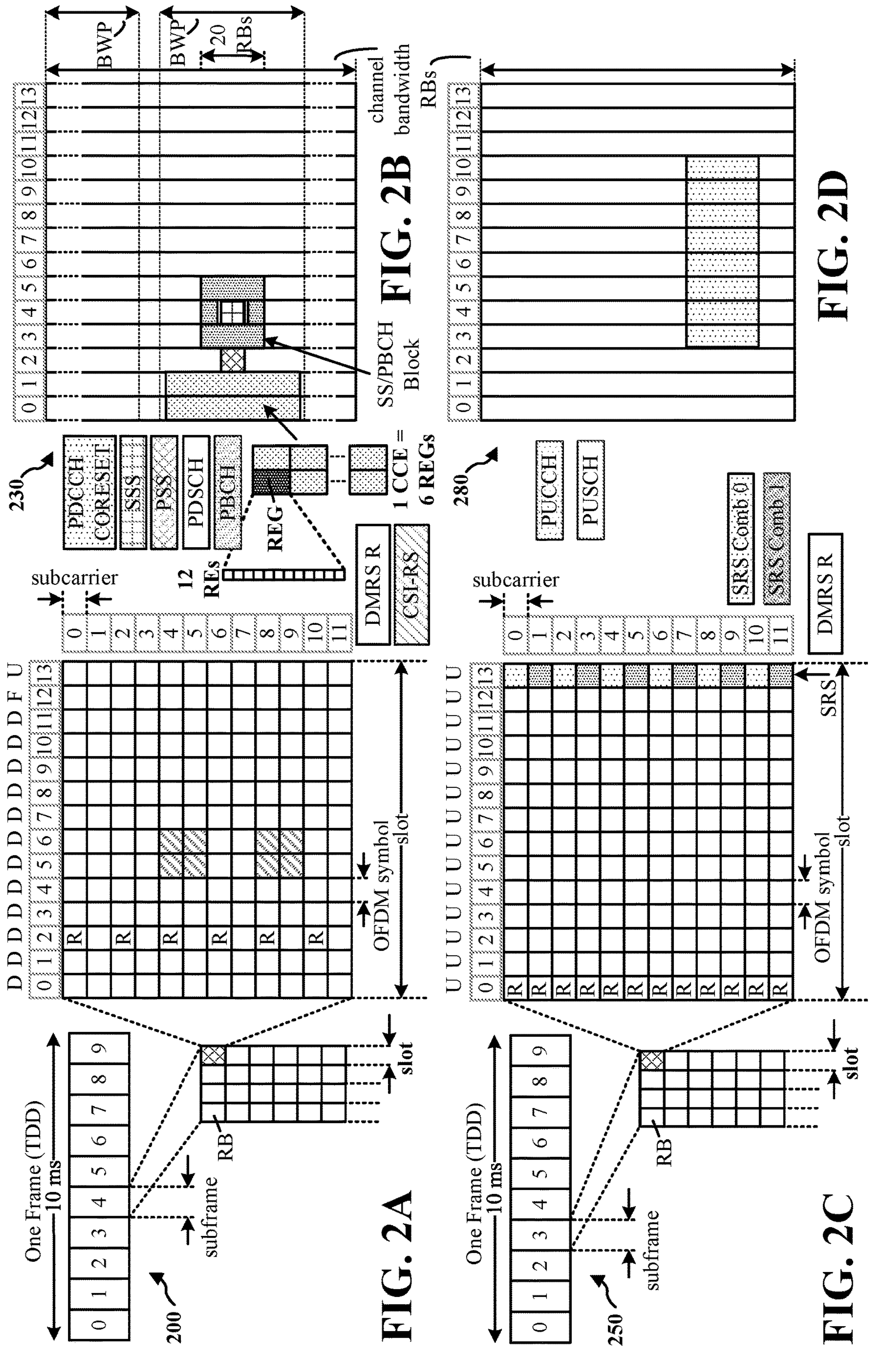
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
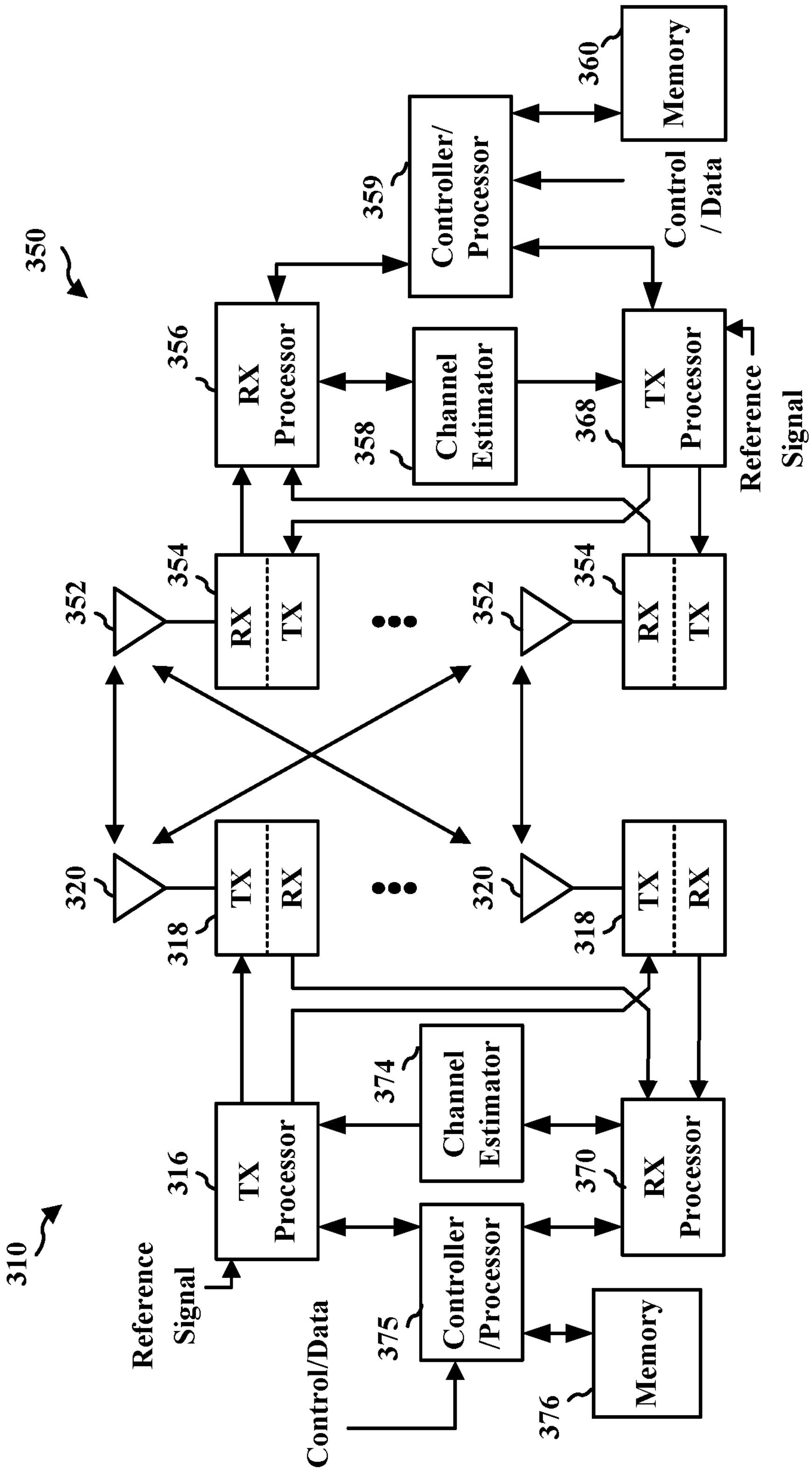
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BP SK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the multiple panels transmission and reception component 198 of FIG. 1. At least one of the TX processor 316, the RX processor 370, and the controller/processor 375 may be configured to perform aspects in connection with the multiple panels scheduling and communicating component 199 of FIG. 1.

Figure 4:
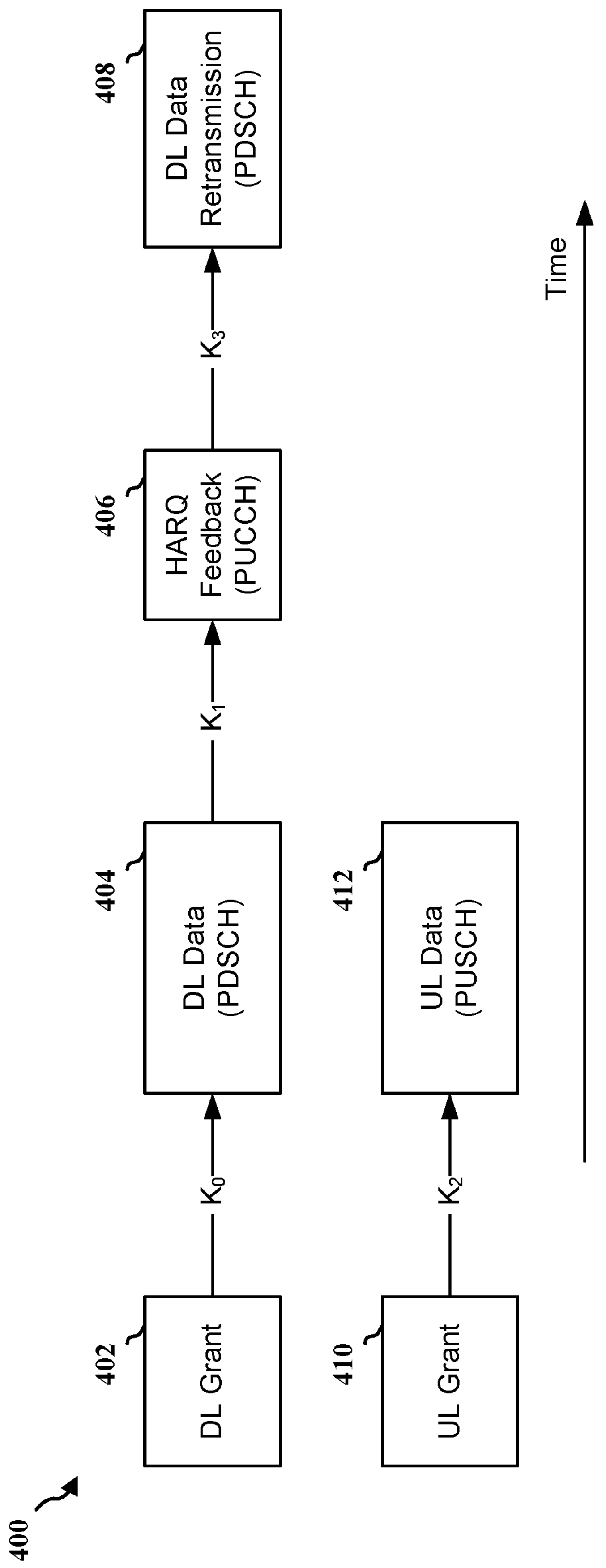
FIG. 4 is a diagram illustrating examples of scheduling offsets for a UE.

A base station may configure a UE with one or more time-domain resources for receiving data from the base station (e.g., via PDSCH) or for transmitting data to the base station (e.g., via PUSCH), where the base station may send the configuration to the UE using a PDCCH. The base station may further schedule various types of scheduling offsets or processing timelines for the UE such that the UE may have sufficient time to process the data, tune its beam(s), provide feedback (e.g., HARQ ACK/NACK), receive retransmissions, etc. FIG. 4 is a diagram 400 illustrating examples of scheduling offsets for a UE. A base station may schedule an offset for a UE between the time a downlink (DL) grant 402 or an uplink (UL) grant 410 is transmitted to the UE and the time the UE receives the corresponding PDSCH 404 (e.g., the DL data) or transmits the corresponding PUSCH 412 (e.g., the UL data), where an offset $K_0$ may indicate the delay (e.g., in slots) between the DL grant 402 reception and corresponding PDSCH 404 reception, and an offset $K_2$ may indicate the delay between the UL grant 410 reception and the corresponding PUSCH 412 transmission. The base station may further schedule an additional offset $K_1$ and/or offset $K_3$ for the UE, where the offset $K_1$ may indicate the delay between the PDSCH 404 reception and the corresponding HARQ feedback 406 (e.g., ACK/NACK) transmission on the UL, and the offset $K_3$ may indicate the delay between the HARQ feedback 406 reception in the UL and the corresponding retransmission of the PDSCH 408 on the DL. The base station may indicate the values for offsets $K_0$, $K_1$ and $K_2$ in the DCI, and the minimum value for offsets $K_0$, $K_1$ and $K_2$ may be zero. UEs with lower capabilities may use a longer offset as they may use a longer RF settling time for their beam weights to be set up, whereas UEs with higher capabilities may use shorter offsets. In scheduling the aforementioned offsets (e.g., $K_0$, $K_1$, $K_2$ and $K_3$), the base station may take the UE processing time into account. For example, in determining the offset $K_1$, the base station may consider the UE processing time for the HARQ feedback (e.g., 406) after the UE receives the DL data over the PDSCH (e.g., 404).

A UE may include multiple antenna panels (which may also be referred to as "panel" or "panels" for purpose of the present disclosure and throughout the specification), where the UE may communicate with one or more base stations or transmission and reception points (TRPs) and/or another UE(s) using multiple antenna panels. For purpose of the present disclosure, the term "antenna panel" may refer to a component, an element or a device that has capabilities to serve as an interface between radio waves propagating through space and electric currents moving in metal conductors. The term "antenna panel(s)" may be used interchangeably with "panel(s)" and/or "UE panel(s)" in the disclosure. While an antenna panel may be used both for transmitting and receiving radio waves, an antenna panel configured for transmitting radio waves may be referred to as a transmission (Tx) panel and/or uplink (UL) panel, and an antenna panel configured for receiving radio waves may be referred to as a reception (Rx) panel and/or downlink (DL) panel.

Figure 5:
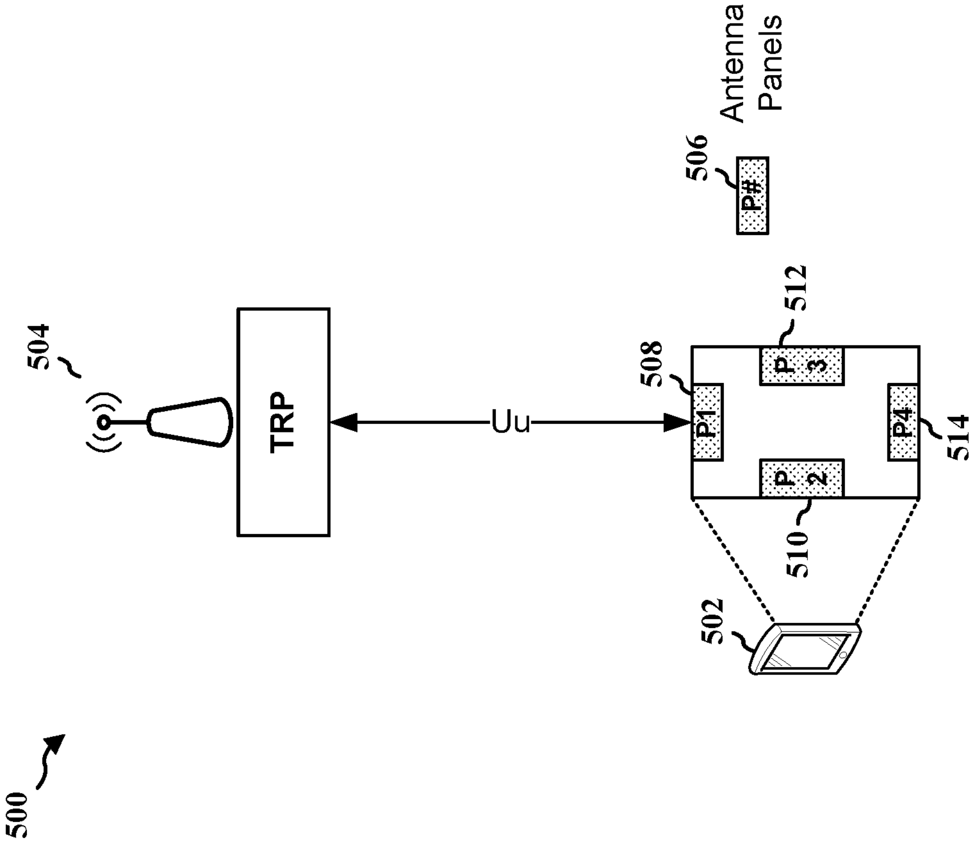
FIG. 5 is a diagram illustrating an example communication involving multiple antenna panels according to aspects of the present disclosure.

FIG. 5 is a diagram 500 illustrating an example communication involving multiple antenna panels. A UE 502 may include multiple antenna panels 506, such as a first antenna panel 508, a second antenna panel 510, a third panel 512 and a fourth antenna panel 514. The UE 502 may communicate with a TRP 504 (e.g., a base station) using one or more antenna panels 506 simultaneously, which may provide an improved communication quality, reliability and/or speed for the UE 502. For example, as each antenna panel 506 may transmit data to and/or receive data from the TRP 504, if one antenna panel has a worse channel condition or fails, the UE 502 may still communicate with the TRP 504 through other antenna panels. The TRP 504 may also configure one or more scheduling offsets to the UE 502, such as the offset $K_1$, and the scheduling offsets may apply to each of the antenna panels 506 or each of the antenna panels 506 that are transmitting and/or receiving (e.g., to working antenna panels). In other words, the antenna panels 506 may transmit and/or receive data based on the configured scheduling offsets, such as described in connection with FIG. 4. However, while the UE 502 may use multiple antenna panels 506 for communication, the antenna panels 506 may be in proximity (i.e., close) to each other or co-located in a physical device. Thus, if one of the antenna panels 506 is experiencing a poor channel condition, such as due to a blockage, the other antenna panels 506 may experience similar or the same poor channel condition. In addition, when the UE 502 is transmitting and/or receiving data using multiple antenna panels 506, additional time and/or resources may be configured for the UE 502 to process the transmitted/receive d data, which may degrade or slow the UE's performance.

Aspects presented herein may improve the reliability, speed and/or bandwidth of wireless communications, where one or more UEs may communicate with one or more TRPs and/or UEs using one or more antenna panels that may be located on other UE(s) or that the antenna panels may not be co-located on one physical device. For example, a group of UEs may be configured to form a virtual UE, where the antenna panel or antenna panels of each UE may be utilized by other UE(s) for communication. As different UEs may be located at different locations and have different UE capabilities, by enabling a UE to use another UE's antenna panel, the transmission reliability and speed may be improved. Each UE within the group or their antenna panels may share a same UE ID and/or antenna ID, such that the base station may perceive the group of UEs as one UE based on the UE ID and/or the antenna ID. Alternatively, or additionally, the base station may also assign a group UE ID to each UE within the group, and may also perceive the group of UEs as one UE based on the group UE ID.

Figure 6:
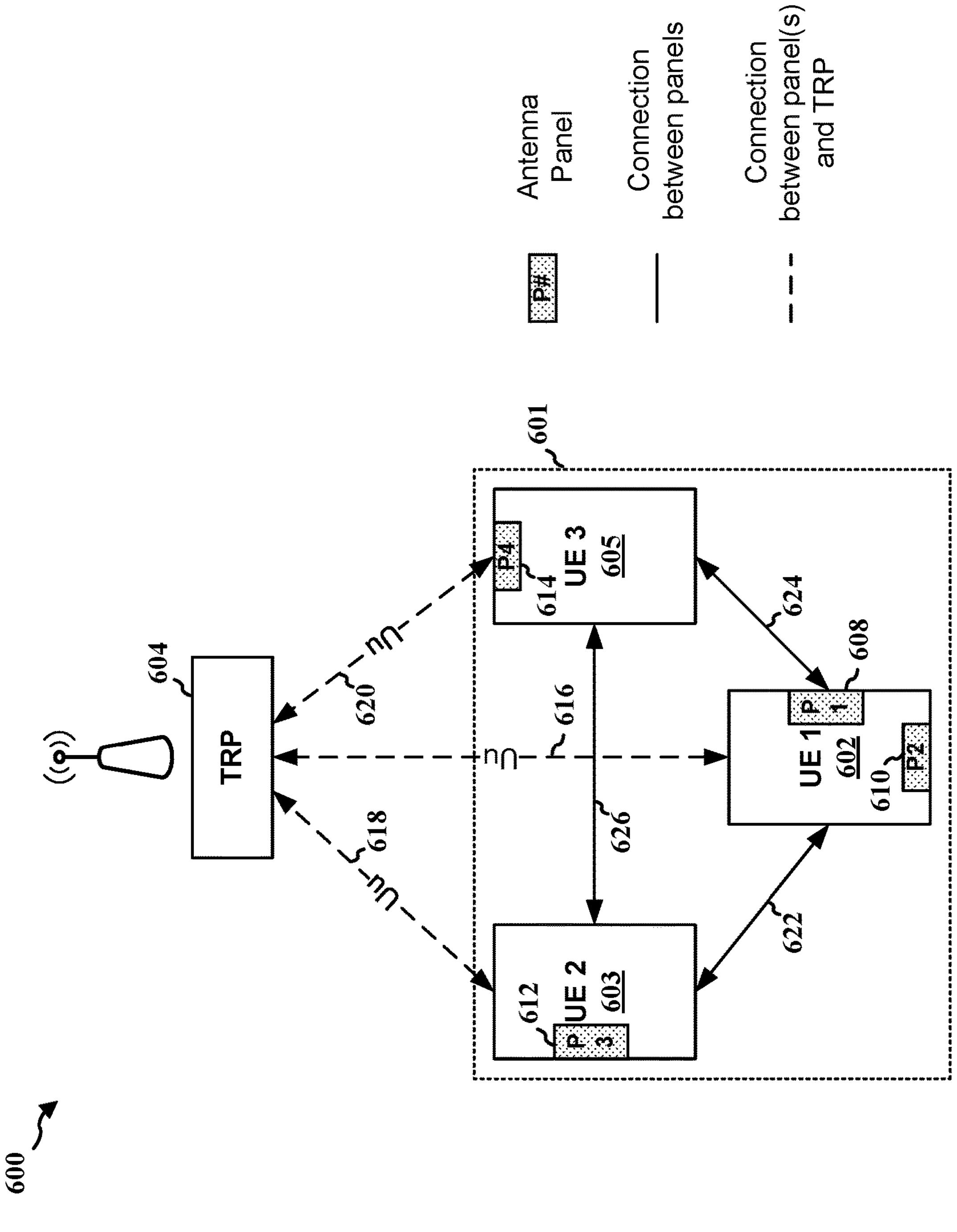
FIG. 6 is a diagram illustrating an example of a UE communicating with a TRP utilizing other UE's antenna panels according to aspects of the present disclosure.

FIG. 6 is a diagram 600 illustrating an example of a UE communicating with a TRP utilizing other UE's antenna panels. A first UE 602 (e.g., a target UE, a source UE, a requesting UE, etc.) may include two antenna panels 608 and 610, where the first UE 602 may communicate with a TRP 604 using the antenna panel 608 and/or the antenna panel 610, such as through a Uu connection 616 (e.g., a direct link). A second UE 603 with an antenna panel 612 may be within the coverage area of the TRP 604, and may be able to communicate with the TRP 604, such as through a direct Uu connection 618. Similarly, a third UE 605 with an antenna panel 614 may also be within the coverage area of the TRP 604, and may be able to communicate with the TRP 604, such as through a direct Uu connection 620.

The first UE 602 or its respective antenna panels (e.g., 608, 610) may establish a connection 622 with the second UE 603 or its antenna panel 612, and the first UE 602 or its respective antenna panels (e.g., 608, 610) may also establish a connection 624 with the third UE 605 or its antenna panel 614. Similarly, an optional connection 626 may be established between the second UE 603/antenna panel 612 and the third UE 605/antenna panel 614. The connections 622, 624 and/or 626 may be physical connections or wireless connections, which may include cable connections, Bluetooth connections, sidelink connections, private connections, connections based on commercial protocols, or a combination thereof.

After the first UE 602 is connected to the second UE 603 and the third UE 605 or their respective antenna panels (e.g., 612, 614), the first UE 602 may utilize their antenna panels for transmitting and/or receiving data from the TRP 604. For example, if the first UE 602 is transmitting data to the TRP 604, the first UE 602 may transmit the data using antenna panels 608 and 610 of the first UE 602, and the UE 602 may also transmit the data (e.g., the same data) using antenna panels 612 and 614, such as by relaying the data to the second UE 603/antenna panel 612 and the third UE 605/antenna panel 614. As such, the TRP 604 may receive the data from different antenna panels (e.g., 608, 610, 612, 614) and/or from different connections (e.g., 616, 618, 620). Similarly, if the TRP 604 is transmitting data to the first UE 602, the TRP 604 may transmit the data to one or more antenna panels (e.g., 608, 610, 612, 614) associated with the first UE 602, such that the first UE 602 may receive the data from different panels that are not co-located (e.g., from different UEs). For example, the first UE 602 may receive the data using antenna panels 608 and 610 of the first UE 602, and the first UE 602 may also receive the data from the antenna panel 612 of the second UE 603 and the antenna panel 614 of the third UE 605, such as through connections 622 and 624 respectively. As such, the first UE 602 may use one or more antenna panels from other UE(s) (e.g., antenna panels 612, 614) for communicating with the TRP 604.

In an aspect, the first UE 602 forms a virtual UE 601 with the second UE 603 and the third UE 605, such that the virtual UE 601 is communicating with the TRP 604 as a UE with multiple antenna panels, such as described in connection with FIG. 5. The second UE 603 and the third UE 605 may be functioning as assisting UEs or cooperative UEs for the first UE 602 (e.g., UE cooperation). In another aspect, the first UE 602, the second UE 603 and the UE 605 may be functioning as disaggregated UEs of a virtual UE (e.g., 601) with distributed antenna panels. By enabling a UE to utilize other UE's antenna panel(s) to communicate with a base station, the reliability, speed and/or bandwidth of communication may be improved. For example, if the channel condition of the connection 616 is dropping due to a blockage or an interference, the first UE 602 may still be able to transmit data to or receive data from the TRP 604 using antenna panels 612 and/or 614 as these antenna panels may not have been effected by the blockage or the interference. In another example, the second UE 603 and/or the third UE 605 may have higher UE capabilities than the first UE 602, such as having better data processing capabilities (e.g., higher CPU). Thus, by using the second UE 603 and/or the third UE 605's antenna panels for transmitting and/or receiving data, the first UE 602 may reduce its workload as there may be less processing at the first UE 602. Antenna panels that are co-located on the same physical device (e.g., a UE), such as described in connection with FIG. 5, may be referred to as "localized panels" whereas antenna panels that are not co-located on the same physical device may be referred to as "distributed panels."

In one example, to enable a UE to use other UE's antenna panels or antenna panels that are not co-located with the UE, a same UE ID and/or a same antenna panel ID may be assigned to the UEs (e.g., 602, 603, 605) and/or the associated antenna panels (e.g., 608, 610, 612, 614). Thus, the TRP 604 may view the combination of antenna panels as from one UE (e.g., the virtual UE 601) as they share the same UE ID and/or antenna panel ID. In other words, the virtual UE 601 may communicate with the TRP 604 like a UE with multiple antenna panels, but one or more antenna panels of the UE may be physically separated by a distance.

Figure 7:
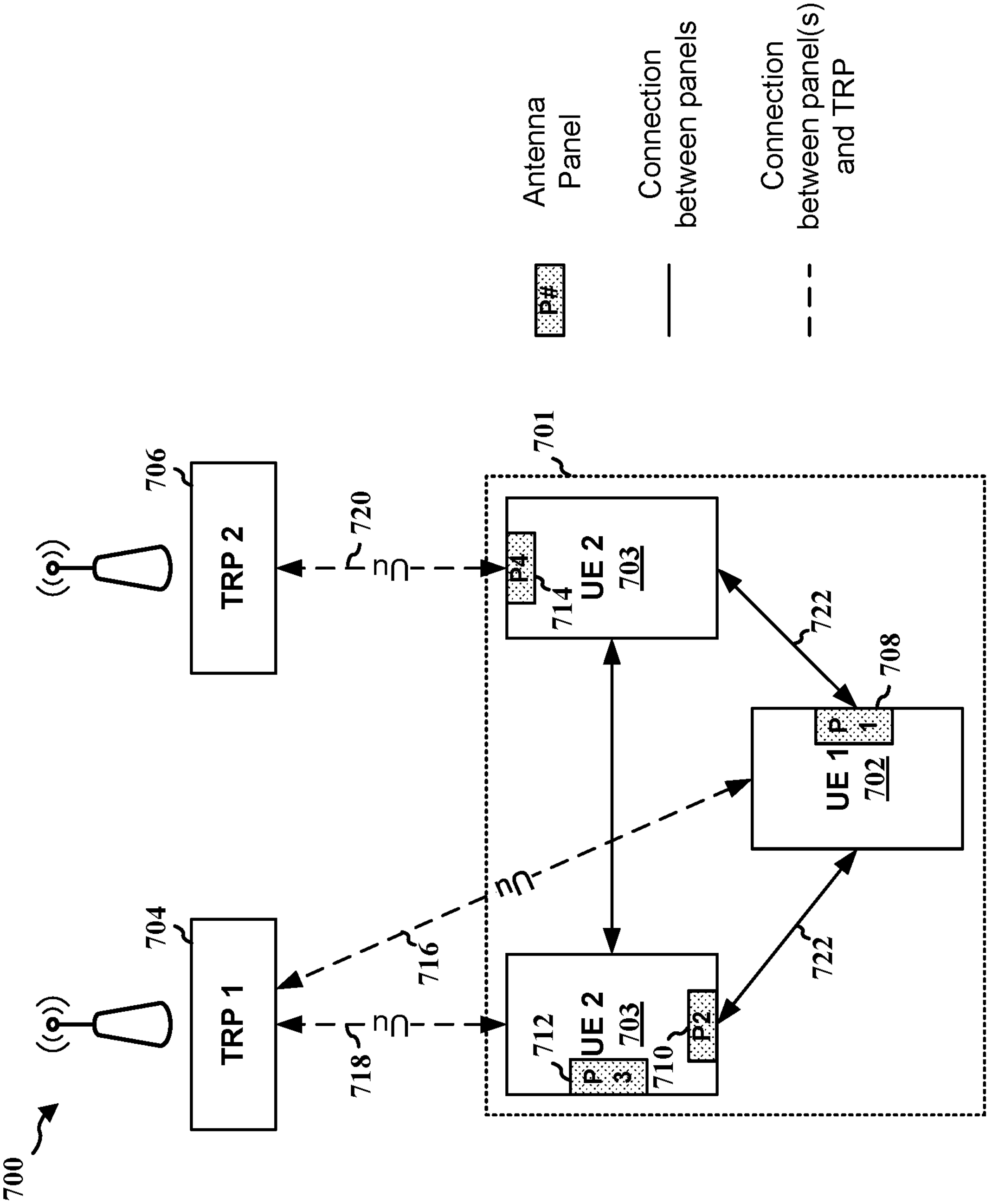
FIG. 7 is a diagram illustrating an example of a UE communicating with multiple TRPs utilizing antenna panels from other UEs according to aspects of the present disclosure.

FIG. 7 is a diagram 700 illustrating an example of a UE communicating with multiple TRPs utilising other UE's antenna panels or antenna panels that are not co-located with the UE. A first UE 702 (e.g., a target UE, a source UE, a requesting UE, etc.) may include an antenna panel 708, where the first UE 702 may communicate with a first TRP 704 using the antenna panel 708, such as through a Uu connection 716 (e.g., a direct link). A second UE 703 with antenna panels 710, 712 and 714 may be within the coverage area of the first TRP 704 and a second TRP 706, such that it is able to communicate with the first TRP 704 and/or the second TRP 706, e.g., through direct Uu connections 718 and 720, respectively. The first UE 702 or its antenna panel 708 may establish a connection 722 with the second UE 703 or its antenna panels 710, 712, and 714. The connections 722 may be a physical connection or a wireless connection, which may include cable connection, Bluetooth connection, sidelink connection, private connection, a connection based on a commercial protocol, or a combination thereof.

After the first UE 702 is connected to the second UE 703 or is associated with the second UE 703's antenna panels (e.g., 710, 712, 714), the first UE 702 may utilize second UE 703's antenna panels for transmitting and/or receiving data from multiple TRPs, such as the first TRP 704 and the second TRP 706. For example, if the first UE 702 is transmitting data to both TRPs 704 and 706, the first UE 702 may transmit the data to the first TRP 704 using its antenna panel 708, and the first UE 702 may also transmit the data (e.g., the same data) to the first TRP 704 using antenna panels 710 and 712 of the second UE 703, such as through the connection 718. The first UE 702 may also transmit the data (e.g., the same data) to the second TRP 706 using the antenna panel 714 of the second UE 703, such as through the connection 720. As such, the first TRP 704 and the second TRP 706 may receive the data from the first UE 702 through different antenna panels (e.g., 708, 710, 712, 714) and/or from different connections (e.g., 718, 720). Similarly, if the first TRP 704 and the second TRP 706 are transmitting data to the first UE 702, the TRP 704 may transmit the data to the first UE 702 through antenna panels 708, 710, 712 (e.g., connections 716, 718), and the TRP 706 may transmit the data to the first UE 702 through the antenna panel 714 (e.g., connection 720), such that the first UE 702 may receive the data from different antenna panels of another UE and also from different TRPs. In other words, the first UE 702 may use its antenna panel and one or more antenna panels from other UE(s) (e.g., antenna panels 710, 712, 714) for communicating with the first TRP 704 and/or the second TRP 706.

In an aspect, the first UE 702 may form a virtual UE 701 with the second UE 703, such that the virtual UE 701 is communicating with the first TRP 704 and the second TRP 706 as a single UE with multiple antenna panels, such as described in connection with FIG. 5. The second UE 703 may be functioning as an assisting UE or a cooperative UE for the first UE 702. In another aspect, the first UE 702 and the second UE 703 may be functioning as disaggregated UEs of a virtual UE (e.g., 701) with distributed antenna panels. This may improve the reliability, speed, and/or bandwidth of the communication, and may also enable the first UE 702 to communicate with a TRP that the first UE 702 does not have a direct connection with (e.g., the second TRP 706). Similarly, to enable the first UE 702 to use the second UE 703's antenna panels, a same UE ID and/or a same antenna panel ID may be assigned to the first UE 702 and the second UE 703 and/or the associated antenna panels (e.g., 708, 710, 712, 714). Thus, the first TRP 704 and/or the second TRP 706 may view the combination of antenna panels as from one UE (e.g., the virtual UE 701) as they share the same UE ID and/or antenna panel ID. In other words, the virtual UE 701 may communicate with the first TRP 704 and/or the second TRP 706 like a UE with multiple antenna panels, but one or more antenna panels of the UE are physically separated by a distance.

As described in connection with FIGS. 4 and 5, a base station may configure one or more scheduling offsets (e.g., offset $K_0$ for a UE with multiple antenna panels, and the scheduling offsets may apply to each of the antenna panels (e.g., each antenna panel is transmitting or receiving with the same scheduling offsets). Similarly, a base station may also configure one or more scheduling offsets for a UE (e.g., UE 602, 702) using one or more antenna panels of other UE(s), as described in connection with FIGS. 6 and 7, or for a UE communicating with multiple TRPs (e.g., single DCI with multiple TRPs scheduling) using multiple antenna panels, where the scheduling offsets may apply to each of the antenna panels associated with the UE. However, as different antenna panels within a UE (e.g., localized panels shown in FIG. 5) or from different UEs (e.g., distributed panels shown in FIGS. 6 and 7) may have different performance, configuration, and/or processing speed (e.g., due to different brand and/or capabilities, etc.), a set of scheduling offsets may be suitable for some antenna panels but may not be suitable for other antenna panels. For example, referring back to FIG. 5, a short offset $K_1$ may be suitable for antenna panels 508 and 510 of the UE 502, but it may not be suitable for antenna panels 512 and 514 as antenna panels 512 and 514 may have lower capabilities than antenna panels 508 and 510. Similarly, referring back to FIG. 6, a short offset $K_1$ may be suitable for the antenna panel 608 of the first UE 602 and the antenna panel 614 of the third UE 605, but the short offset may not be suitable for the antenna panel 610 of the first UE 602 and the antenna panel 612 of the second UE 603 as they may have lower antenna capabilities.

Aspects presented herein may enable different scheduling offsets, such as the offset $K_1$ for reporting the HARQ feedback of a received PDSCH, to be configured for different antenna panels or different sets of antenna panels, such that antenna panels with different processing capabilities may use different scheduling offsets. In one aspect of the present disclosure, a base station may use downlink control information (DCI) to schedule a PDSCH to be received by a number of N antenna panels (e.g., antenna panels within a UE or from multiple UEs), and the DCI may also indicate M PUCCH repetitions for one or more antenna panels of the N antenna panels to transmit HARQ feedback (e.g., ACK/NACK). Thus, based on the received DCI, one or more antenna panels of the N antenna panels may provide HARQ feedback for a PDSCH using different PUCCH resources (e.g., repetitions) based on the one or more antenna panels' PD SCH decoding result(s).

Figure 8:
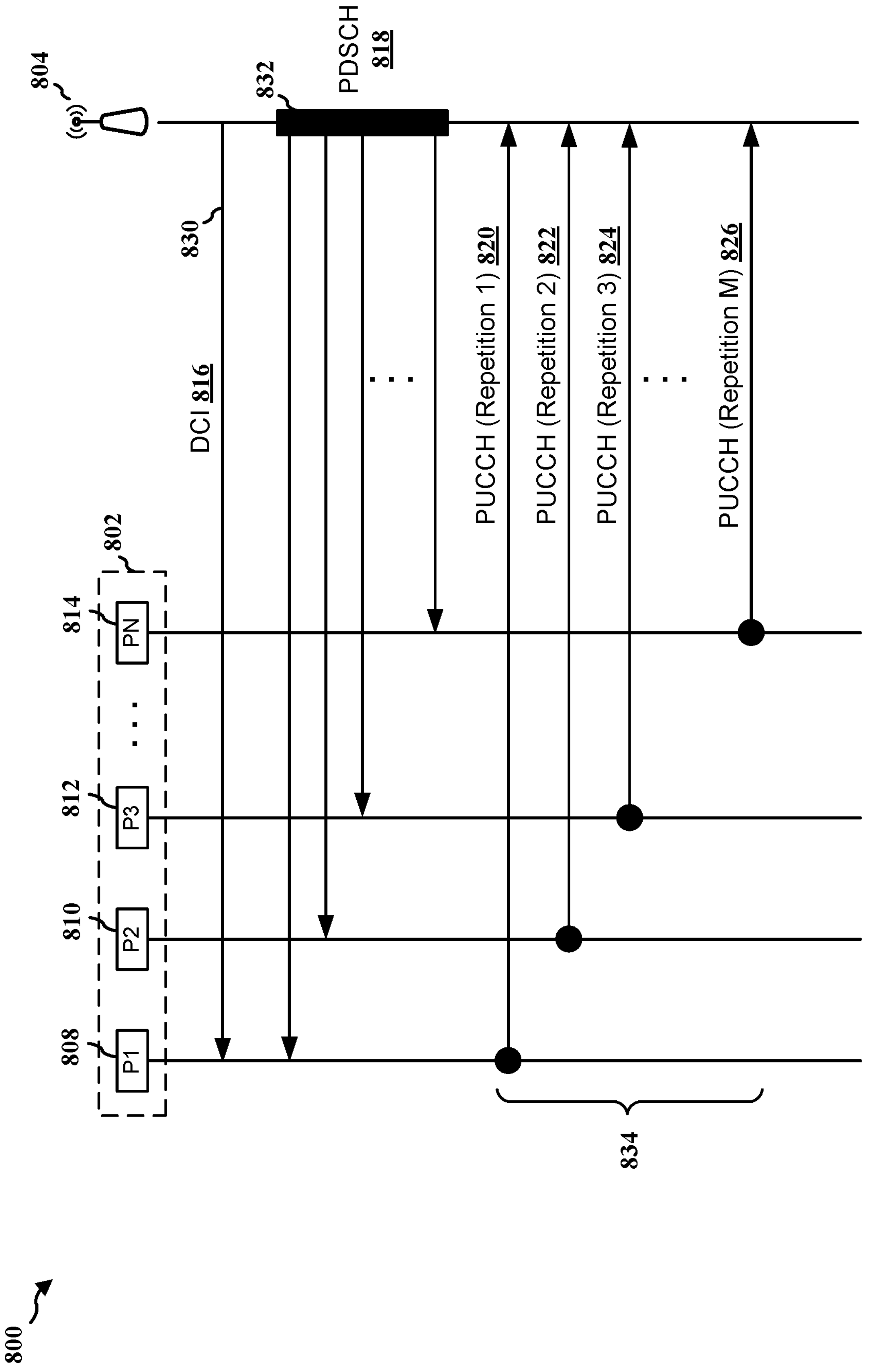
FIG. 8 is a communication flow illustrating an example HARQ feedback reporting for a communication involving multiple antenna panels according to aspects of the present disclosure.

FIG. 8 is a communication flow 800 illustrating an example HARQ feedback reporting for a communication involving multiple antenna panels according to aspects of the present disclosure. The HARQ feedback may be based on per-antenna panel feedback, where each configured or allocated PUCCH repetition may be associated with an antenna panel, and each antenna panel may provide HARQ feedback (e.g., ACK/NACK) and generate the HARQ codebook in the PUCCH repetition associated with the antenna panel. In other words, each antenna panel may be configured with a PUCCH repetition or resource for providing the HARQ feedback to a received PUSCH, such that each antenna panel may provide HARQ feedback based on whether the PUSCH is successfully received or decoded at each antenna panel.

For example, a UE 802 (e.g., UE 502, 601, 602, 701, 702) may be associated with N antenna panels (e.g., 808, 810, 812, 814), where the UE 802 may communicate with a base station 804 (e.g., TRP 504, 604) or multiple base stations (e.g., TRPs 704, 706) using the N antenna panels, such as described in connection with FIGS. 5 to 7. The N antenna panels (e.g., 808, 810, 812, 814) may be allocated within a UE as described in connection with FIG. 5, or the N antenna panels may include antenna panels from different UEs or may not be co-located as described in connection with FIGS. 6 and 7.

At 830, the base station 804 may transmit DCI 816 (e.g., downlink/uplink grant) to the UE 802 (e.g., to at least one of the antenna panels of the UE 802), where the DCI 816 may schedule a PDSCH 818 to be received by the N antenna panels (e.g., 808, 810, 812, 814) of the UE 802. The DCI 816 may also schedule/indicate M PUCCH repetitions (e.g., 820, 822, 824, 826) for the N antenna panels to provide HARQ feedbacks for the PDSCH 818. As each antenna panel may be configured or associated with a PUCCH repetition for providing the HARQ feedback, the number of PUCCH repetitions may equal to the number of antenna panels (e.g., N=M). For example, a first PUCCH repetition 820 may be associated with the first antenna panel 808, a second PUCCH repetition 822 may be associated with the second antenna panel 810, a third PUCCH repetition 824 may be associated with the third antenna panel 812, and a $M^{th}$ PUCCH repetition 826 may be associated with the $N^{th}$ antenna panel 814, etc.

At 832, the base station 804 may transmit the PDSCH 818 to the N antenna panels (e.g., 808, 810, 812, 814) of the UE 802. Then, at 834, based on the reception status of the PDSCH 818 (e.g., whether the PDSCH 818 is received or successfully decoded, etc.) at each of the N antenna panels, each antenna panel may transmit HARQ feedback for the PDSCH 818 using the associated PUCCH repetition. For example, the first antenna panel 808 may use the first PUCCH repetition 820 to transmit the HARQ feedback to the base station 804, and the $N^{th}$ antenna panel 814 may use the Mt PUCCH repetition 826 to transmit the HARQ feedback to the base station 804, etc. Thus, each antenna panel may feedback ACK/NACK bits and generate the HARQ codebook in the PUCCH repetition associated with the antenna panel. The HARQ codebook in different PUCCH repetitions may be the same or different. For example, the first antenna panel 808 may use the first PUCCH repetition 820 to transmit the HARQ feedback with an NACK for the received PDSCH 818 to the base station 804, and the $N^{th}$ antenna panel 814 may use the Mt PUCCH repetition 826 to transmit the HARQ feedback with an ACK for the received PDSCH 818 to the base station 804. For example, in some PUCCH repetition procedures, for some PUCCH formats (e.g., PUCCH formats 1, 3, or 4), a UE may be configured a number of slots, $$N_{PUCCH}^{repeat},$$

for repetitions of a PUCCH transmission by respective number of slots (e.g., nrofSlots). If a UE is provided a PUCCH configuration (e.g., PUCCH-config) that includes subslotLengthForPUCCH-r16, the UE may not expect PUCCH-config to include nrofSlots. For example, for $$N_{PUCCH}^{repeat} > 1,$$

the UE may repeat the PUCCH transmission with the UCI over $$N_{PUCCH}^{repeat}$$

slots. The PUCCH transmission in each of the $$N_{PUCCH}^{repeat}$$

slots may have a same number of consecutive symbols, as provided by nrofSymbols in PUCCH-format1, nrofSymbols in PUCCH-format3, or nrofSymbols in PUCCH-format4. A PUCCH transmission in each of the $$N_{PUCCH}^{repeat}$$

slots may have a same first symbol, as provided by startingSymbolIndex in PUCCH-format1, startingSymbolIndex in PUCCH-format3, or startingSymbolIndex in PUCCH-format4.

The UE may be configured by interslotFrequencyHopping whether or not to perform frequency hopping for PUCCH transmissions in different slots. For example, if the UE is configured to perform frequency hopping for PUCCH transmissions across different slots, the UE may perform frequency hopping per slot. The UE may transmit the PUCCH starting from a first PRB, provided by startingPRB, in slots with even number and starting from the second PRB, provided by secondHopPRB, in slots with odd number. The slot indicated to the UE for the first PUCCH transmission may have number 0 and each subsequent slot until the UE transmits the PUCCH in $$N_{PUCCH}^{repeat}$$

slots is counted regardless of whether or not the UE transmits the PUCCH in the slot. In some examples, the UE may not expect to be configured to perform frequency hopping for a PUCCH transmission within a slot. If the UE is not configured to perform frequency hopping for PUCCH transmissions across different slots and if the UE is configured to perform frequency hopping for a PUCCH transmission within a slot, the frequency hopping pattern between the first PRB and the second PRB is same within each slot.

If the UE determines that, for a PUCCH transmission in a slot, the number of symbols available for the PUCCH transmission is smaller than the value provided by nrofSymbols for the corresponding PUCCH format, the UE may not transmit the PUCCH in the slot. A SS/PBCH block symbol may be a symbol of an SS/PBCH block with candidate SS/PBCH block index corresponding to the SS/PBCH block index indicated to a UE by ssb-PositionsInBurst in SIB1 or ssb-PositionsInBurst in ServingCellConfigCommon. For unpaired spectrum, the UE may determine the $$N_{PUCCH}^{repeat}$$

slots for a PUCCH transmission starting from a slot indicated to the UE for HARQ-ACK reporting, or a slot determined for SR reporting or for CSI reporting and having an UL symbol or flexible symbol that is not SS/PBCH block symbol provided by startingSymbolIndex in PUCCH-format1, or in PUCCH-format3, or in PUCCH-format4 as a first symbol, and consecutive UL symbols or flexible symbols that are not SS/PBCH block symbols, starting from the first symbol, equal to or larger than a number of symbols provided by nrofsymbols in PUCCH-format1, or in PUCCH-format3, or in PUCCH-format4. For paired spectrum, the UE may determine the $$N_{PUCCH}^{repeat}$$

slots for a PUCCH transmission as the $$N_{PUCCH}^{repeat}$$

consecutive slots starting from a slot indicated to the UE for HARQ-ACK reporting, or a slot determined for SR reporting or for CSI reporting.

In some examples, if a UE would transmit a PUCCH over a first number $$N_{PUCCH}^{repeat} > 1$$

of slots and the UE would transmit a PUSCH with repetition Type A over a second number of slots, and the PUCCH transmission would overlap with the PUSCH transmission in one or more slots, and the conditions for multiplexing the UCI in the PUSCH are satisfied in the overlapping slots, the UE may transmit the PUCCH and may not transmit the PUSCH in the overlapping slots. In other examples, if a UE would transmit a PUCCH over a first number $$N_{PUCCH}^{repeat} > 1$$

of slots and the UE would transmit a PUSCH with repetition Type B over a second number of slots, and the PUCCH transmission would overlap with actual PUSCH repetitions in one or more slots, and the conditions for multiplexing the UCI in the PUSCH are satisfied for the overlapping actual PUSCH repetitions, the UE may transmit the PUCCH and may not transmit the overlapping actual PUSCH repetitions.

In another example, a UE may not multiplex different UCI types in a PUCCH transmission with repetitions over $$N_{PUCCH}^{repeat} > 1$$

slots. If a UE would transmit a first PUCCH over more than one slot and at least a second PUCCH over one or more slots, and the transmissions of the first PUCCH and the second PUCCH would overlap in a number of slots then, for each slot of the number of slots and with UCI type priority of HARQ-ACK>SR>CSI with higher priority>CSI with lower priority, the UE may not expect the first PUCCH and any of the second PUCCHs to start at a same slot and include a UCI type with same priority. If the first PUCCH and any of the second PUCCHs include a UCI type with same priority, the UE may transmit the PUCCH starting at an earlier slot and does not transmit the PUCCH starting at a later slot. If the first PUCCH and any of the second PUCCHs do not include a UCI type with same priority, the UE may transmits the PUCCH that includes the UCI type with higher priority and may not transmit the PUCCH that include the UCI type with lower priority.

In another example, a UE may not expect a PUCCH that is in response to a DCI format detection to overlap with any other PUCCH that does not satisfy a corresponding timing conditions. If a UE would transmit a PUCCH over $$N_{PUCCH}^{repeat}$$

slots and the UE does not transmit the PUCCH in a slot from the $$N_{PUCCH}^{repeat}$$

slots due to overlapping with another PUCCH transmission in the slot, the UE may count the slot in the number of $$N_{PUCCH}^{repeat}$$

slots.

Figure 9:
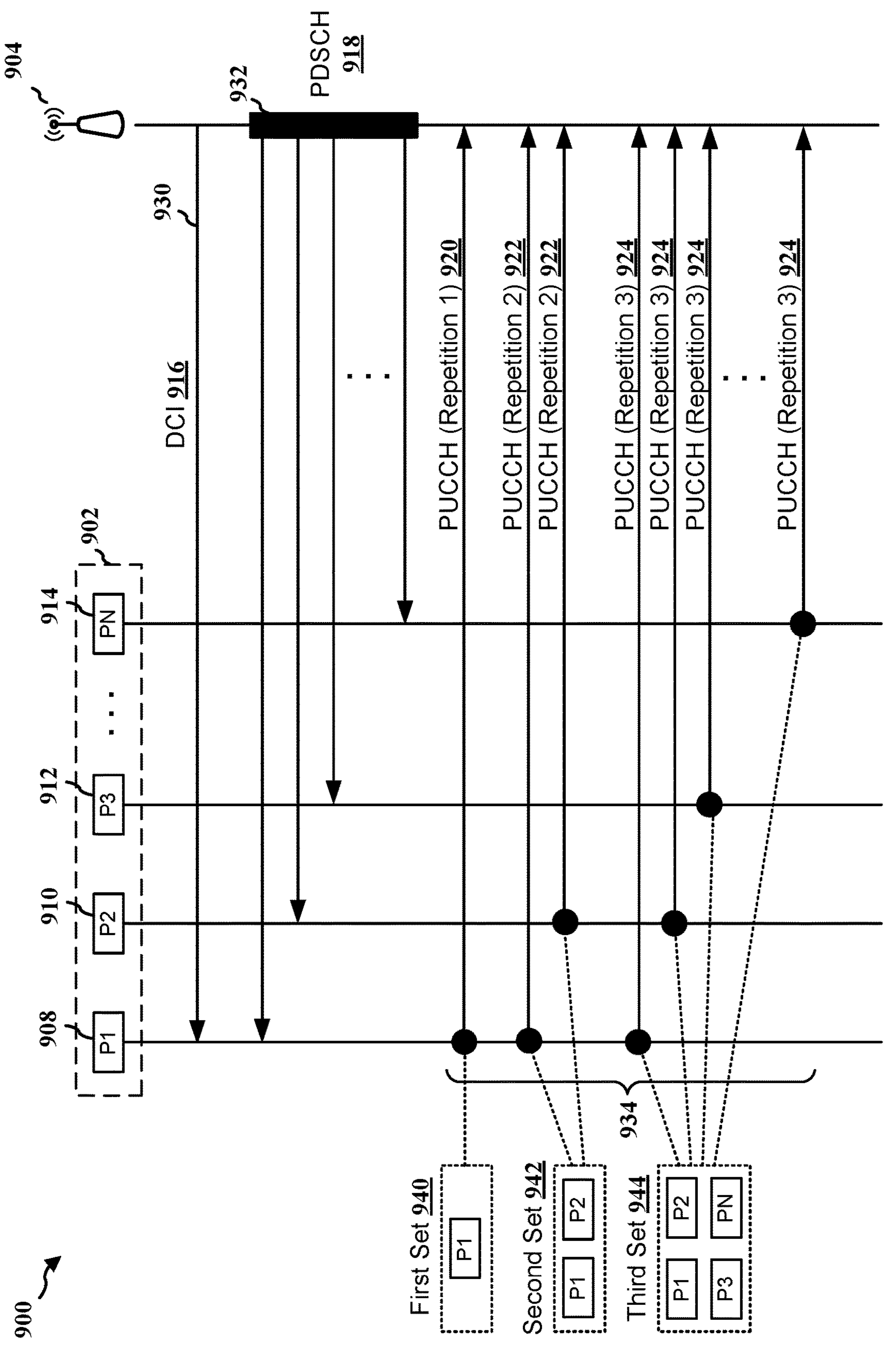
FIG. 9 is a communication flow illustrating an example HARQ feedback reporting for a communication involving multiple antenna panels according to aspects of the present disclosure.

FIG. 9 is a communication flow 900 illustrating an example HARQ feedback reporting for a communication involving multiple antenna panels according to aspects of the present disclosure. The HARQ feedback may be based on progressive feedback, where a first PUCCH repetition may be associated with a first set of panels, and the first set of panels may feedback ACK/NACK bits and generate the HARQ codebook in the first PUCCH repetition, and a second PUCCH repetition may be associated with a second set of panels, and the second set of panels may feedback ACK/NACK bits and generate the HARQ codebook in the second PUCCH repetition, etc.

For example, a UE 902 (e.g., UE 502, 601, 602, 701, 702) may be associated with N antenna panels (e.g., 908, 910, 912, 914), where the UE 902 may communicate with a base station 904 (e.g., TRP 504, 604) or multiple base stations (e.g., TRPs 704, 706) using the N antenna panels, such as described in connection with FIGS. 5 to 7. The N antenna panels (e.g., 908, 910, 912, 914) may be allocated within a UE as described in connection with FIG. 5, or the N antenna panels may include antenna panels from different UEs or may not be co-located as described in connection FIGS. 6 and 7.

At 930, the base station 904 may transmit DCI 916 to the UE 902 (e.g., to at least one of the antenna panels of the UE 902), where the DCI 916 may schedule a PDSCH 918 to be received by the N antenna panels (e.g., 908, 910, 912, 914) of the UE 902. The DCI 916 may also schedule/indicate one or more PUCCH repetitions (e.g., 920, 922, 924), where each PUCCH repetition may be associated with a set of antenna panels within the N antenna panels for the set of antenna panels to provide HARQ feedbacks for the PDSCH 918. For example, a first PUCCH repetition 920 may be associated with a first set 940 of antenna panels that include the first antenna panel 908, a second PUCCH repetition 922 may be associated with a second set 942 of antenna panels that include the first antenna panel 908 and the second antenna panel 910, and a third PUCCH repetition 924 may be associated with a third set 944 of antenna panels that include the first antenna panel 908, the second antenna panel 910, the third antenna panel 912, and the $N^{th}$ antenna panel 914, etc. The antenna panel(s) within one set of antenna panels may overlap with antenna panel(s) within another set of antenna panels. For example, the first set of antenna panels may be a subset of the second set of antenna panels, e.g., the first set={panel1}, second set={panel1 and panel2}.

At 932, the base station 904 may transmit the PDSCH 918 to the N antenna panels (e.g., 908, 910, 912, 914) of the UE 902. Then, at 934, based on the reception status of the PDSCH 918 (e.g., whether the PDSCH 918 is received or successfully decoded, etc.) at each of the N antenna panels, each antenna panel may transmit HARQ feedback for the PDSCH 918 using one or more associated PUCCH repetition(s). For example, the first set 940 of antenna panels (e.g., antenna panel 908) may transmit the HARQ feedback to the base station 904 using the first PUCCH repetition 920, the second set 942 of antenna panels (e.g., antenna panels 908, 910) may transmit the HARQ feedback to the base station 904 using the second PUCCH repetition 922, and the third set 944 of antenna panels (e.g., antenna panels 908, 910, 912, 914) may transmit the HARQ feedback to the base station 904 using the third PUCCH repetition 924, etc. Thus, each set of antenna panels may feedback ACK/NACK bits and generate the HARQ codebook in its associated PUCCH repetition. Each set of antenna panels may transmit HARQ feedback for the PDSCH 918 using one or more associated PUCCH repetition(s) based on the received PDSCH 918 at the corresponding set of antenna panels. The HARQ codebook in different PUCCH repetition may be the same or different. For example, the first set of antenna panels may use the first PUCCH repetition to transmit the HARQ feedback with an NACK for the received PDSCH 918 to the base station 904, and the second set of antenna panels may use the second PUCCH repetition to transmit the HARQ feedback with an ACK for the received PDSCH 918 to the base station 904, etc.

In another aspect of the present disclosure, a base station may also indicate the offset $K_1$ to multiple antenna panels when scheduling a PDSCH and corresponding PUCCH repetition(s) for the multiple antenna panels.

Figure 10:
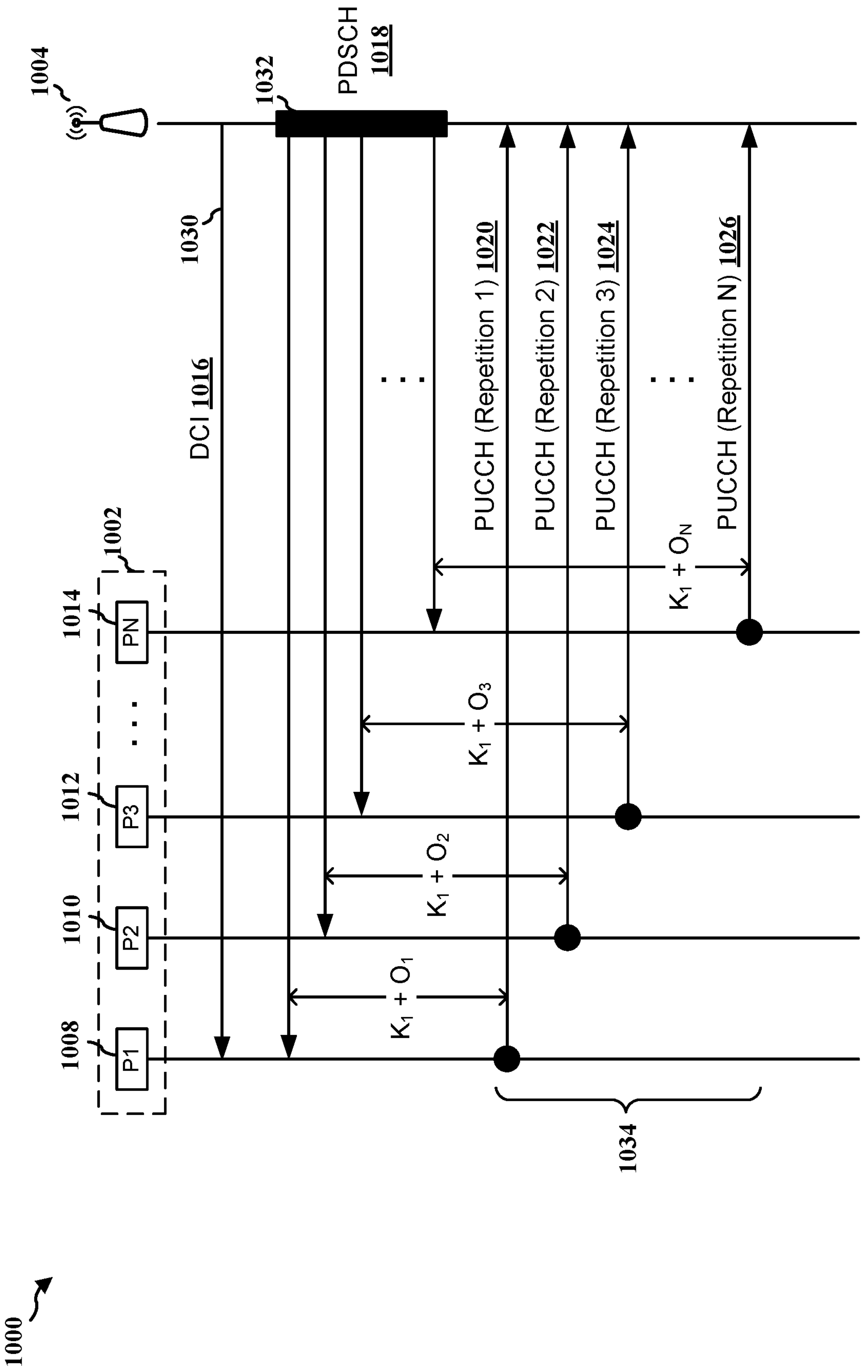
FIG. 10 is a communication flow illustrating an example HARQ feedback reporting for a communication involving multiple antenna panels according to aspects of the present disclosure.

FIG. 10 is a communication flow 1000 illustrating an example HARQ feedback reporting for a communication involving multiple antenna panels according to aspects of the present disclosure. A base station may configure each antenna panel or a set of antenna panels with an offset $K_1$, such that each antenna panel or each set of antenna panels may transmit HARQ feedback (e.g., using a PUCCH repetition) based on the indicated offset $K_1$ and optionally with an antenna panel-specific offset (e.g., an offset unique to each antenna panel or each set of antenna panels). The antenna panel-specific offset may be preconfigured or prefixed (e.g., preloaded on the UE or the antenna panel) or configured by the base station, such as based on the antenna-panel's capabilities. For example, the antenna panel-specific offset may be preconfigured by RRC signaling.

For example, a UE 1002 (e.g., UE 502, 601, 602, 701, 702) may be associated with N antenna panels (e.g., 1008, 1010, 1012, 1014), where the UE 1002 may communicate with a base station 1004 (e.g., TRP 504, 604) or multiple base stations (e.g., TRPs 704, 706) using the N antenna panels, such as described in connection with FIGS. 5 to 7. The N antenna panels (e.g., 1008, 1010, 1012, 1014) may be allocated within a UE as described in connection with FIG. 5, or the N antenna panels may include antenna panels from different UEs or may not be co-located as described in connection FIGS. 6 and 7.

At 1030, the base station 1004 may transmit DCI 1016 (e.g., downlink/uplink grant) to the UE 1002 (e.g., to at least one of the antenna panels of the UE 1002), where the DCI 1016 may schedule a PDSCH 1018 to be received by the N antenna panels (e.g., 1008, 1010, 1012, 1014) of the UE 1002. The DCI 1016 may also schedule/indicate one or more PUCCH repetitions for the N antenna panels to provide HARQ feedbacks for the PDSCH 1018. In one example, as described in connection with FIG. 8, each antenna panel may be configured or associated with a PUCCH repetition for providing the HARQ feedback, thus the number of PUCCH repetitions may equal to the number of antenna panels. For example, a first PUCCH repetition 1020 may be associated with the first antenna panel 1008, a second PUCCH repetition 1022 may be associated with the second antenna panel 1010, a third PUCCH repetition 1024 may be associated with the third antenna panel 1012, and a $N^{th}$ PUCCH repetition 1026 may be associated with the $N^{th}$ antenna panel 1014, etc. In another example, as described in connection with FIG. 9, each PUCCH repetition may be associated with a set of antenna panels within the N antenna panels. For example, a first PUCCH repetition 1020 may be associated with a first set of antenna panels that include the first antenna panel 1008, a second PUCCH repetition 1022 may be associated with a second set of antenna panels that include the first antenna panel 1008 and the second antenna panel 1010, and a third PUCCH repetition 1024 may be associated with a third set of antenna panels that include the first antenna panel 1008, the second antenna panel 1010, the third antenna panel 1012, and the $N^{th}$ antenna panel 1014, etc. The antenna panel(s) within one set of antenna panels may overlap with antenna panel(s) within another set of antenna panels.

In addition, the DCI 1016 may indicate a field of PDSCH-to-HARQ feedback timing indicator, which has an offset $K_1$ value (e.g., the slot offset timing from the slot of PDSCH reception to the slot of PUCCH transmission), such that each antenna panel or each set of antenna panels within the N antenna panels may transmit the HARQ feedback on the associated PUCCH repetition based on the indicated K and optionally on an antenna panel-specific offset ($O_N$).

At 1032, the base station 1004 may transmit the PDSCH 1018 to the N antenna panels (e.g., 1008, 1010, 1012, 1014) of the UE 1002. Then, at 1034, based on the reception status of the PDSCH 1018 (e.g., whether the PDSCH 1018 is received or successfully decoded, etc.) at each of the N antenna panels, each antenna panel or each set of antenna panels or each antenna within the set of antenna panels may transmit HARQ feedback for the PDSCH 1018 using the associated PUCCH repetition after the scheduled offset $K_1$ or after the scheduled offset $K_1$ plus the antenna panel-specific offset (e.g., $K_1+O_N$). For example, the first antenna panel 1008 or the first set of antenna panels may use the first PUCCH repetition 1020 to transmit the HARQ feedback to the base station 1004 at $K_1+O_1$, where $O_1$ is the antenna panel-specific offset for the first antenna panel 1008 or the first set of antenna panels; the second antenna panel 1010 or the second set of antenna panels may use the second PUCCH repetition 1022 to transmit the HARQ feedback to the base station 1004 at $K_1+O_2$, where $O_2$ is the antenna panel-specific offset for the second antenna panel 1010 or the second set of antenna panels; the third antenna panel 1012 or the third set of antenna panels may use the third PUCCH repetition 1024 to transmit the HARQ feedback to the base station 1004 at $K_1+O_3$ or the third set of antenna panels, where $O_3$ is the antenna panel-specific offset for the third antenna panel 1012; and the $N^{th}$ antenna panel 1014 may use the $N^{th}$ PUCCH repetition 1026 to transmit the HARQ feedback to the base station 1004 at $K_1+O_N$, where $O_N$ is the antenna panel-specific offset for the $N^{th}$ antenna panel 1014, etc. Thus, each antenna panel or each set of antenna panels within the N antenna panels may transmit the HARQ feedback on the PUCCH repetition based on the indicated offset K and optionally on an antenna panel-specific offset ($O_N$). Similarly, each antenna panel or each set of antenna panels may transmit HARQ feedback for the PDSCH 1018 using one or more associated PUCCH repetition(s) based on the received PDSCH 1018 at the corresponding antenna panel or set of antenna panels. The HARQ codebook in different PUCCH repetitions may be the same or different. For example, the first antenna panel 1008 may use the first PUCCH repetition 1020 to transmit the HARQ feedback with an NACK for the received PDSCH 1018 to the base station 1004, and the $N^{th}$ antenna panel 1014 may use the $M^{th}$ PUCCH repetition 1026 to transmit the HARQ feedback with an ACK for the received PDSCH 1018 to the base station 1004, etc.

Figure 11:
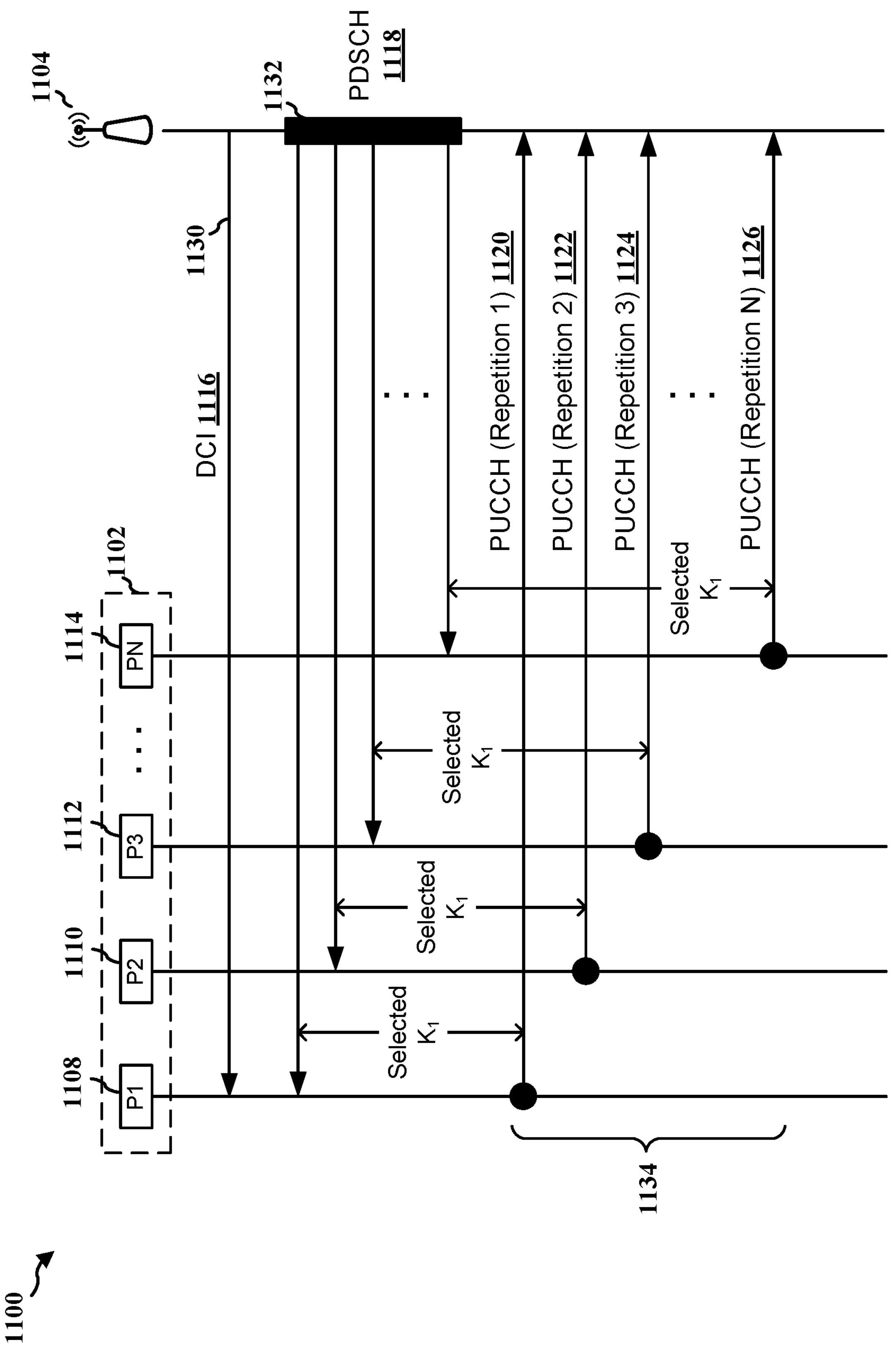
FIG. 11 is a communication flow illustrating an example HARQ feedback reporting for a communication involving multiple antenna panels according to aspects of the present disclosure.

FIG. 11 is a communication flow 1100 illustrating an example HARQ feedback reporting for a communication involving multiple antenna panels according to aspects of the present disclosure. A base station may configure each antenna panel or a set of antenna panels with a set of $K_1$ values such that each antenna panel or each set of antenna panels may transmit HARQ feedback (e.g., using a PUCCH repetition) based at least in part on one of the $K_1$ value within the set of $K_1$ values. The $K_1$ value that is to be used by an antenna panel or a set of antenna panels may be selected based on the antenna-panel's capabilities.

For example, a UE 1102 (e.g., UE 502, 601, 602, 701, 702) may be associated with N antenna panels (e.g., 1108, 1110, 1112, 1114), where the UE 1102 may communicate with a base station 1104 (e.g., TRP 504, 604) or multiple base stations (e.g., TRPs 704, 706) using the N antenna panels, such as described in connection with FIGS. 5 to 7. The N antenna panels (e.g., 1108, 1110, 1112, 1114) may be allocated within a UE as described in connection with FIG. 5, or the N antenna panels may include antenna panels from different UEs or may not be co-located, as described in connection FIGS. 6 and 7.

At 1130, the base station 1104 may transmit DCI 1116 (e.g., downlink/uplink grant) to the UE 1102 (e.g., to at least one of the antenna panels of the UE 1102), where the DCI 1116 may schedule a PDSCH 1118 to be received by the N antenna panels (e.g., 1108, 1110, 1112, 1114) of the UE 1102. The DCI 1116 may also schedule/indicate one or more PUCCH repetitions for the N antenna panels to provide HARQ feedbacks for the PDSCH 1118. In one example, as described in connection with FIG. 8, each antenna panel may be configured or associated with a PUCCH repetition for providing the HARQ feedback, thus the number of PUCCH repetitions may equal to the number of antenna panels. For example, a first PUCCH repetition 1120 may be associated with the first antenna panel 1108, a second PUCCH repetition 1122 may be associated with the second antenna panel 1110, a third PUCCH repetition 1124 may be associated with the third antenna panel 1112, and a $N^{th}$ PUCCH repetition 1126 may be associated with the $N^{th}$ antenna panel 1114, etc. In another example, as described in connection with FIG. 9, each PUCCH repetition may be associated with a set of antenna panels within the N antenna panels. For example, a first PUCCH repetition 1120 may be associated with a first set of antenna panels that include the first antenna panel 1108, a second PUCCH repetition 1122 may be associated with a second set of antenna panels that include the first antenna panel 1108 and the second antenna panel 1110, and a third PUCCH repetition 1124 may be associated with a third set of antenna panels that include the first antenna panel 1108, the second antenna panel 1110, the third antenna panel 1112, and the $N^{th}$ antenna panel 1114, etc. The antenna panel(s) within one set of antenna panels may overlap with antenna panel(s) within another set of antenna panels.

In addition, the DCI 1116 may indicate a field of a PDSCH-to-HARQ feedback timing indicator, which is mapped to a set of $K_1$ values (e.g., the slot offset timing from the slot of PDSCH reception to the slot of PUCCH transmission), such that each antenna panel or each set of antenna panels within the N antenna panels may transmit the HARQ feedback on the associated PUCCH repetition by selecting one of the $K_1$ value within the set of $K_1$ values. The mapping of a set of $K_1$ values to a field of PDSCH-to-HARQ feedback timing indicator in the DCI 1116 may be preconfigured by RRC signalling.

At 1132, the base station 1104 may transmit the PDSCH 1118 to the N antenna panels (e.g., 1108, 1110, 1112, 1114) of the UE 1102. Then, at 1134, based on the reception status of the PDSCH 1118 (e.g., whether the PDSCH 1118 is received or successfully decoded, etc.) at each of the N antenna panels, each antenna panel or each set of antenna panels or each antenna within the set of antenna panels may transmit HARQ feedback for the PDSCH 1118 using the associated PUCCH repetition after an offset $K_1$ selected from the set of $K_1$ values. For example, the first antenna panel 1108 or the first set of antenna panels may use the first PUCCH repetition 1120 to transmit the HARQ feedback to the base station 1104 based on an offset $K_1$ selected from the set of $K_1$ values (e.g., $1^{st}$ $K_1$ value in the set); the second antenna panel 1110 or the second set of antenna panels may use the second PUCCH repetition 1122 to transmit the HARQ feedback to the base station 1104 based on an offset $K_1$ selected from the set of $K_1$ values (e.g., $2^{nd}$ $K_1$ value in the set); the third antenna panel 1112 or the third set of antenna panels may use the third PUCCH repetition 1124 to transmit the HARQ feedback to the base station 1104 based on an offset $K_1$ selected from the set of $K_1$ values (e.g., $3^{rd}$ $K_1$ value in the set); and the $N^{th}$ antenna panel 1114 may use the $N^{th}$ PUCCH repetition 1126 to transmit the HARQ feedback to the base station 1104 based on an offset $K_1$ selected from the set of $K_1$ values (e.g., $N^{th}$ $K_1$ value in the set), etc. Thus, each antenna panel or each set of antenna panels within the N antenna panels may transmit the HARQ feedback on the PUCCH repetition based on a $K_1$ value within the set of $K_1$ values. Similarly, each antenna panel or each set of antenna panels may transmit HARQ feedback for the PDSCH 1118 using one or more associated PUCCH repetition(s) based on the received PDSCH 1118 at the corresponding antenna panel or set of antenna panels. The HARQ codebook in different PUCCH repetitions may be the same or different. For example, the first antenna panel 1108 may use the first PUCCH repetition 1120 to transmit the HARQ feedback with an NACK for the received PDSCH 1118 to the base station 1104, and the $N^{th}$ antenna panel 1114 may use the Mt PUCCH repetition 1126 to transmit the HARQ feedback with an ACK for the received PDSCH 1118 to the base station 1104, etc.

In some examples, a UE may not expect to transmit more than one PUCCH with HARQ-ACK information in a slot. For example, for DCI format 1_0, the PDSCH-to-HARQ feedback timing indicator (e.g., $K_0$ field values may map to {1, 2, 3, 4, 5, 6, 7, 8}. For a DCI format, other than DCI format 1_0, scheduling a PDSCH reception or a SPS PDSCH release, the PDSCH-to-HARQ_feedback timing indicator field values, if present, may map to values for a set of number of slots provided by dl-DataToUL-ACK, or dl-DataToUL-ACKForDCIFormat1_2 for DCI format 1_2.

In another example, for a SPS PDSCH reception ending in slot n, the UE may transmit the PUCCH in slot n+k where k is provided by the PDSCH-to-HARQ_feedback timing indicator field, if present, in a DCI format activating the SP S PDSCH reception. If the UE detects a DCI format that does not include a PDSCH-to-HARQ_feedback timing indicator field and schedules a PDSCH reception or activates a SPS PDSCH reception ending in slot n, the UE may provide corresponding HARQ-ACK information in a PUCCH transmission within slot n+k where k is provided by dl-DataToUL-ACK, or by dl-DataToUL-ACKForDCIFormat1_2 for DCI format 1_2.

In another example, with reference to slots for PUCCH transmissions, if the UE detects a DCI format scheduling a PDSCH reception ending in slot n or if the UE detects a DCI format indicating a SPS PDSCH release through a PDCCH reception ending in slot n, or if the UE detects a DCI format that requests Type-3 HARQ-ACK codebook report and does not schedule a PDSCH reception through a PDCCH reception ending in slot n, the UE may provide corresponding HARQ-ACK information in a PUCCH transmission within slot n+k, where k is a number of slots and is indicated by the PDSCH-to-HARQ_feedback timing indicator field in the DCI format, if present, or provided by dl-DataToUL-ACK, or by dl-DataToUL-ACKForDCIFormat1_2 for DCI format 1_2. k=0 corresponds to the last slot of the PUCCH transmission that overlaps with the PDSCH reception or with the PDCCH reception in case of SPS PDSCH release or in case of the DCI format that requests Type-3 HARQ-ACK codebook report and does not schedule a PDSCH reception. In another aspect of the present disclosure, a base station may also indicate a field of PUCCH resource repetition indicator (PRI) in the DCI, which has a single PRI value, such that each antenna panel or each set of antenna panels may transmit HARQ feedback based on the indicated PRI and/or the per-antenna panel PUCCH resource configuration.

Figure 12:
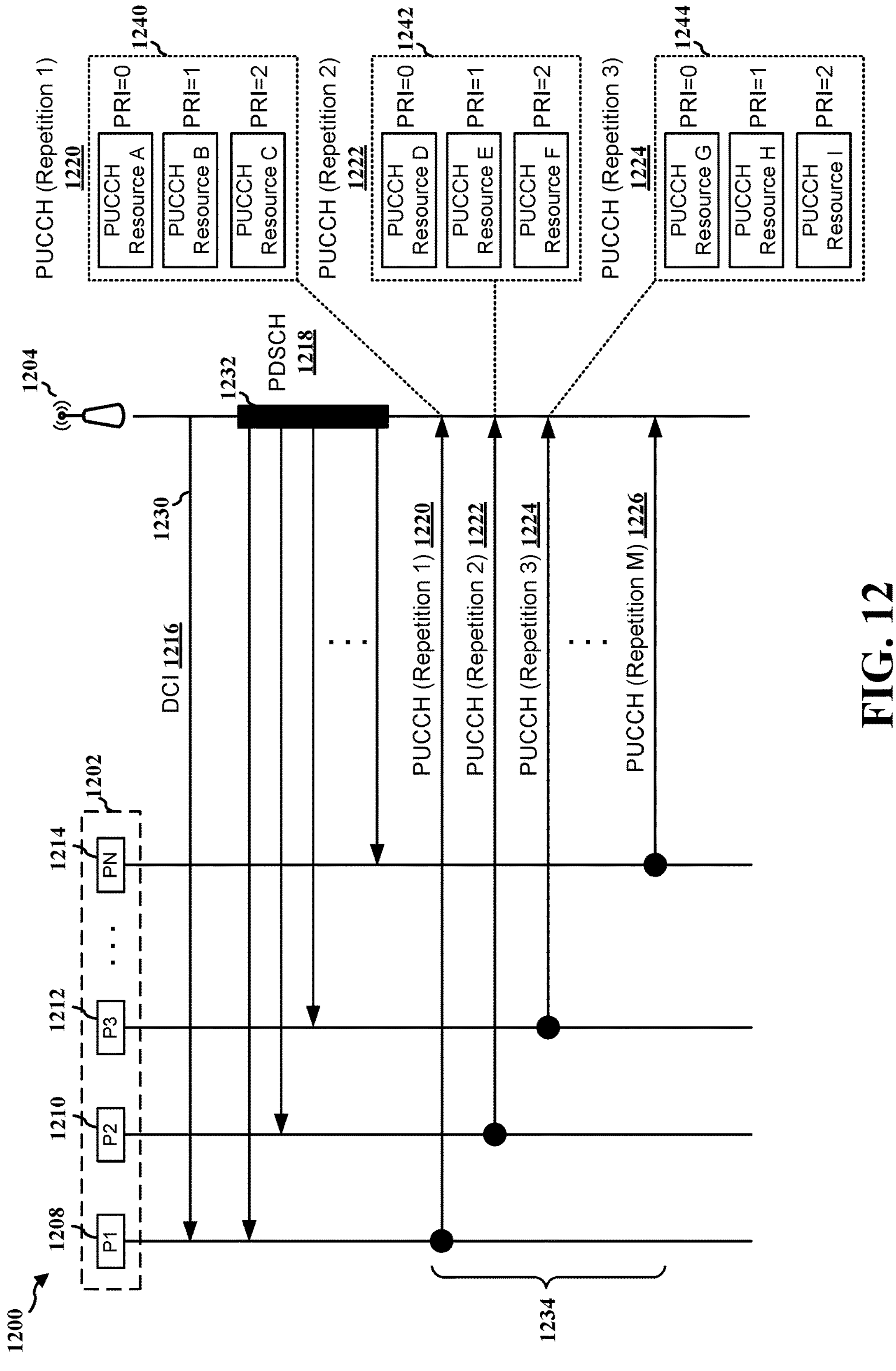
FIG. 12 is a communication flow illustrating an example HARQ feedback reporting for a communication involving multiple antenna panels according to aspects of the present disclosure.

FIG. 12 is a communication flow 1200 illustrating an example HARQ feedback reporting for a communication involving multiple antenna panels according to aspects of the present disclosure. A base station may indicate a PRI value (e.g., via the DCI) to a UE using multiple antenna panels, where the PRI value may correspond to a PUCCH resource within a set of PUCCH resources.

For example, a UE 1202 (e.g., UE 502, 601, 602, 701, 702) may be associated with N antenna panels (e.g., 1208, 1210, 1212, 1214), where the UE 1202 may communicate with a base station 1204 (e.g., TRP 504, 604) or multiple base stations (e.g., TRPs 704, 706) using the N antenna panels, such as described in connection with FIGS. 5 to 7. The N antenna panels (e.g., 1208, 1210, 1212, 1214) may be allocated within a UE as described in connection with FIG. 5, or the N antenna panels may include antenna panels from different UEs or may not be co-located as described in connection FIGS. 6 and 7.

At 1230, the base station 1204 may transmit DCI 1216 (e.g., downlink/uplink grant) to the UE 1202 (e.g., to at least one of the antenna panels of the UE 1202), where the DCI 1216 may schedule a PDSCH 1218 to be received by the N antenna panels (e.g., 1208, 1210, 1212, 1214) of the UE 1202. The DCI 1216 may also schedule/indicate one or more PUCCH repetitions for the N antenna panels to provide HARQ feedbacks for the PDSCH 1218. In one example, as described in connection with FIG. 8, each antenna panel may be configured or associated with a PUCCH repetition for providing the HARQ feedback, thus the number of PUCCH repetitions may equal to the number of antenna panels. For example, a first PUCCH repetition 1220 may be associated with the first antenna panel 1208, a second PUCCH repetition 1222 may be associated with the second antenna panel 1210, a third PUCCH repetition 1224 may be associated with the third antenna panel 1212, and a $N^{th}$ PUCCH repetition 1226 may be associated with the $N^{th}$ antenna panel 1214, etc. In another example, as described in connection with FIG. 9, each PUCCH repetition may be associated with a set of antenna panels within the N antenna panels. For example, a first PUCCH repetition 1220 may be associated with a first set of antenna panels that include the first antenna panel 1208, a second PUCCH repetition 1222 may be associated with a second set of antenna panels that include the first antenna panel 1208 and the second antenna panel 1210, and a third PUCCH repetition 1224 may be associated with a third set of antenna panels that include the first antenna panel 1208, the second antenna panel 1210, the third antenna panel 1212, and the $N^{th}$ antenna panel 1214, etc. The antenna panel(s) within one set of antenna panels may overlap with antenna panel(s) within another set of antenna panels.

In addition, the DCI 1216 may further indicate a field of a PUCCH resource repetition indicator, which has a single PRI value, and each antenna panel or each set of antenna panels or each antenna within the set of antenna panels may transmit a HARQ feedback using a resource within the associated PUCCH repetition as indicated by the PRI value. For example, the first PUCCH repetition 1220 that is associated with the first antenna panel 1208 may also be associated with a PUCCH resource set 1240, where the PUCCH resource set 1240 may include resources A, B and C that correspond to PM values 0, 1 and 2 (e.g., each PM value is mapped to a resource). The second PUCCH repetition 1222 that is associated with the second antenna panel 1210 may also be associated with a PUCCH resource set 1242, where the PUCCH resource set 1242 may include resources D, E and F that correspond to PRI values 0, 1 and 2. Similarly, the third PUCCH repetition 1224 that is associated with the third antenna panel 1212 may also be associated with a PUCCH resource set 1244, where the PUCCH resource set 1244 may include resources G, H, and I that correspond to PM values 0, 1, and 2, respectively.

At 1232, the base station 1204 may transmit the PDSCH 1218 to the N antenna panels (e.g., 1208, 1210, 1212, 1214) of the UE 1202. Then, at 1234, based on the reception status of the PDSCH 1218 (e.g., whether the PDSCH 1218 is received or successfully decoded, etc.) at each of the N antenna panels, each antenna panel or each set of antenna panels may transmit HARQ feedback for the PDSCH 1218 using the resources indicated by the PM within the associated PUCCH repetition. For example, if the PRI=0 is indicated, then the first antenna panel 1208 may use resource A in the PUCCH resource set 1240 to transmit the HARQ feedback as the resource A corresponds to PRI=0; the second antenna panel 1210 may use resource D in the PUCCH resource set 1242 to transmit the HARQ feedback as the resource D corresponds to PRI=0; and the third antenna panel 1212 may use resource G in the PUCCH resource set 1244 to transmit the HARQ feedback as the resource D corresponds to PRI=0, etc. Similarly, if the PRI=2, then the first antenna panel 1208 may use resource C in the PUCCH resource set 1240 to transmit the HARQ feedback as the resource C corresponds to PRI=2; the second antenna panel 1210 may use resource F in the PUCCH resource set 1242 to transmit the HARQ feedback as the resource F corresponds to PRI=2; and the third antenna panel 1212 may use resource I in the PUCCH resource set 1244 to transmit the HARQ feedback as the resource I corresponds to PRI=2, etc. Thus, each antenna panel or each set of antenna panels may transmit a PUCCH repetition based on the indicated PM and the per-panel PUCCH resource configuration.

Alternatively, or additionally, the base station may indicate a field of PM in the DCI, which may be mapped to a set of PRI values, and each antenna panel or each set of antenna panels or each antenna within the set of antenna panels may transmit HARQ feedback using a resource that correspond to a PRI value within the set of PRI values in the associated PUCCH resource set. In other words, each antenna panel or each set of antenna panels may transmit a PUCCH repetition based on the indicated per-panel PRI. The mapping of a set of PM values to a field of PM indicator in the DCI may be preconfigured by RRC signaling.

For example, referring back to FIG. 12, at 1230, the DCI 1216 may further indicate a field of PUCCH resource repetition indicator, which may be mapped to a set of PRI values, and each antenna panel or each set of antenna panels may transmit a HARQ feedback using a resource that is associated with a PRI value within the set of PRI values. For example, the first PUCCH repetition 1220 that is associated with the first antenna panel 1208 may also be associated with a PUCCH resource set 1240, where the PUCCH resource set 1240 may include resources A, B and C that correspond to PRI values 0, 1 and 2 (e.g., each PRI value is mapped to a resource). The second PUCCH repetition 1222 that is associated with the second antenna panel 1210 may also be associated with a PUCCH resource set 1242, where the PUCCH resource set 1242 may include resources D, E and F that correspond to PRI values 0, 1 and 2. Similarly, the third PUCCH repetition 1224 that is associated with the third antenna panel 1212 may also be associated with a PUCCH resource set 1244, where the PUCCH resource set 1244 may include resources G, H and I that correspond to PRI values 0, 1 and 2.

At 1232, the base station 1204 may transmit the PDSCH 1218 to the N antenna panels (e.g., 1208, 1210, 1212, 1214) of the UE 1202. Then, at 1234, based on the reception status of the PDSCH 1218 (e.g., whether the PDSCH 1218 is received or successfully decoded, etc.) at each of the N antenna panels, each antenna panel or each set of antenna panels may transmit HARQ feedback for the PDSCH 1218 using a resource that correspond to a PRI value within the set of PRI values. For example, if the multiple PRI values include PRI=0, PRI=1 and PRI=2, then the first antenna panel 1208 may use resource A (e.g., corresponds to PRI=0) in the PUCCH resource set 1240 to transmit the HARQ feedback; the second antenna panel 1210 may use resource F (e.g., corresponds to PRI=2) in the PUCCH resource set 1242 to transmit the HARQ feedback; and the third antenna panel 1212 may use resource H (e.g., corresponds to PRI=1) in the PUCCH resource set 1244 to transmit the HARQ feedback, etc. Thus, each antenna panel or each set of antenna panels may transmits a PUCCH repetition based on the indicated per-antenna panel PM.

Similarly, each antenna panel or each set of antenna panels may transmit HARQ feedback for the PDSCH 1218 using one or more associated PUCCH repetition(s) based on the received PDSCH 1218 at the corresponding set of antenna panels. The HARQ codebook in different PUCCH repetitions may be the same or different. For example, the first antenna panel 1208 may use the first PUCCH repetition 1220 to transmit the HARQ feedback with an NACK for the received PDSCH 1218 to the base station 1204, and the $N^{th}$ antenna panel 1214 may use the Mt PUCCH repetition 1226 to transmit the HARQ feedback with an ACK for the received PDSCH 1218 to the base station 1204, etc.

In some examples, for a PUCCH transmission with HARQ-ACK information, a UE may determine a PUCCH resource after determining a set of PUCCH resources for $O_{UCI}$ HARQ-ACK information bits. The PUCCH resource determination may be based on a PUCCH resource indicator field (e.g., a PRI field), if present, in a last DCI format, among the DCI formats that have a value of a PDSCH-to-HARQ_feedback timing indicator field, if present, or a value of dl-DataToUL-ACK, or a value of dl-DataToUL-ACK-ForDCIFormat1_2 for DCI format 1_ 2, indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH monitoring occasion indexes. For indexing DCI formats within a serving cell for a same PDCCH monitoring occasion, if the UE is not provided CORESETPoolIndex or is provided CORESETPoolIndex with value 0 for one or more first CORESETs and is provided CORESETPoolIndex with value 1 for one or more second CORESETs on an active DL BWP of a serving cell, and with ackNackFeedbackMode-r16=joint for the active UL BWP, detected DCI formats from PDCCH receptions in the first CORESETs are indexed prior to detected DCI formats from PDCCH receptions in the second CORESETs.

Figure 13:
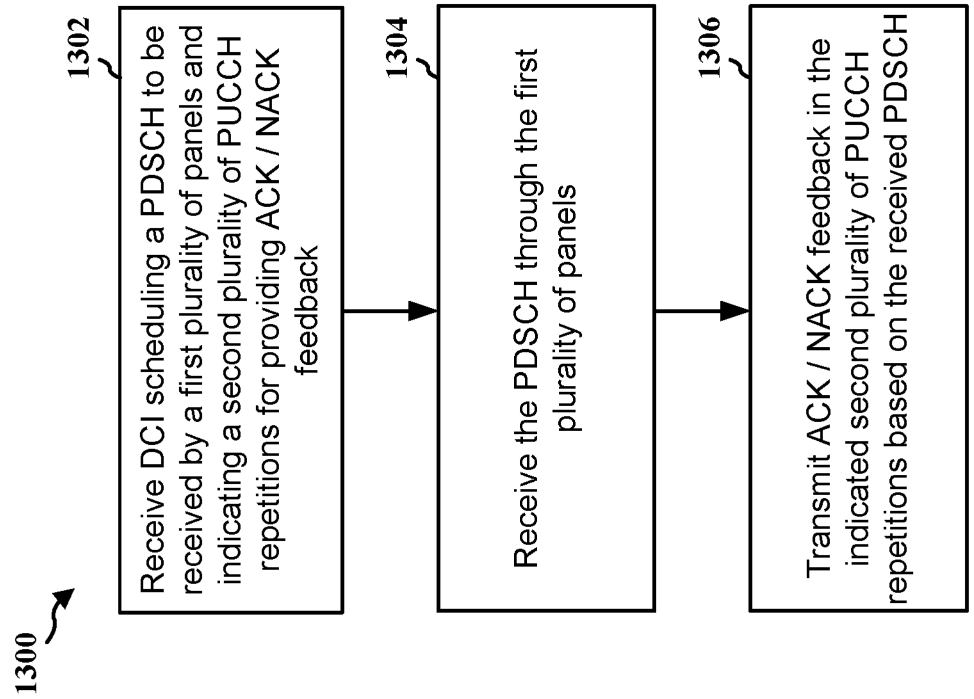
FIG. 13 is a flowchart of a method of wireless communication.

FIG. 13 is a flowchart 1300 of a method of wireless communication. The method may be performed by a UE (e.g., the UE 104, 502, 602, 702, 802, 902, 1002, 1102, 1202; the apparatus 1402). The method may enable the UE to transmit and receive data using multiple panels (e.g., antenna panels), and to provide HARQ feedback for individual panels based on their PDSCH reception status (e.g., decoding result).

At 1302, the UE may receive DCI scheduling a PDSCH to be received by a first plurality of panels and indicating a second plurality of PUCCH repetitions for providing ACK/NACK feedback, such as described in connection with FIGS. 8 to 12. For example, at 830, the UE 802 may receive a DCI 816 from the base station 804, such as from one of its antenna panels 808. The DCI 816 may schedule a PDSCH 818 to be received by N antenna panels (e.g., 808, 810, 812, 814) of the UE 802. The DCI 816 may also schedule/indicate M PUCCH repetitions (e.g., 820, 822, 824, 826) for the N antenna panels to provide HARQ feedbacks for the PDSCH 818.

At 1304, the UE may receive the PDSCH through the first plurality of panels, such as described in connection with FIGS. 8 to 12. For example, at 832, the UE 802 may receive the PDSCH through antenna panels 808, 810, 812 and 814 from the base station 804. The first plurality of panels may be co-located within the UE, or one or more panels of the first plurality of panels may be located on a different UE. The panels may share a same panel ID or a group panel ID.

At 1306, the UE may transmit ACK/NACK feedback in the indicated second plurality of PUCCH repetitions based on the received PDSCH, such as described in connection with FIGS. 8 to 12. For example, at 834, the UE 802 may transmit HARQ feedbacks to the base station 804 using PUCCH repetitions 820, 822, 824 and 826. The ACK/NACK feedback may be transmitted from each of first plurality of panels based on the PDSCH received in each of first plurality of panels.

In one example, each of the second plurality of PUCCH repetitions may be associated with one of the first plurality of panels, such that the UE may transmit the ACK/NACK feedback from each of the first plurality of panels in a PUCCH repetition that is associated with each panel.

In another example, each of the second plurality of PUCCH repetitions may be associated with a subset of panels within the first plurality of panels, such that the UE may transmit the ACK/NACK feedback from at least one of the subset of panels in a PUCCH repetition that is associated with the subset of panels. For example, a first PUCCH repetition in the second plurality of PUCCH repetitions may be associated with a first subset of panels within the first plurality of panels and a second PUCCH repetition in the second plurality of PUCCH repetitions may be associated with a second subset of panels within the first plurality of panels. Then, the UE may transmit the ACK/NACK feedback from at least one of the first subset of panels in the first PUCCH repetition and from at least one of the second subset of panels in the second PUCCH repetition. In some examples, the first subset of panels may be a subset of the second subset of panels.

In another example, the DCI may include an ACK/NACK feedback timing indicator, and each of the first plurality of panels may be associated with a panel-specific offset value. The ACK/NACK feedback timing indicator may include a single offset value ($K_1$), where the UE may transmit the ACK/NACK feedback based at least in part on the single offset value and the panel-specific offset value from at least one of the first plurality of panels.

In another example, the DCI may include an ACK/NACK feedback timing indicator that include a set of offset ($K_1$) values, and the UE may transmit the ACK/NACK feedback based at least in part on one of the offset values from at least one of the first plurality of panels.

In another example, the DCI may include a PUCCH resource indicator (PRI), and each of the first plurality of panels may be associated with a PUCCH resource set. In one example, the PRI may include a single PRI value, where the UE may transmit the ACK/NACK feedback using a resource from the PUCCH resource set that corresponds to the single PRI value. Alternatively, or additionally, the PRI may include a set of PRI values, where the UE may transmit the ACK/NACK feedback using a resource from the PUCCH resource set that corresponds to one of the PRI values.

Figure 14:
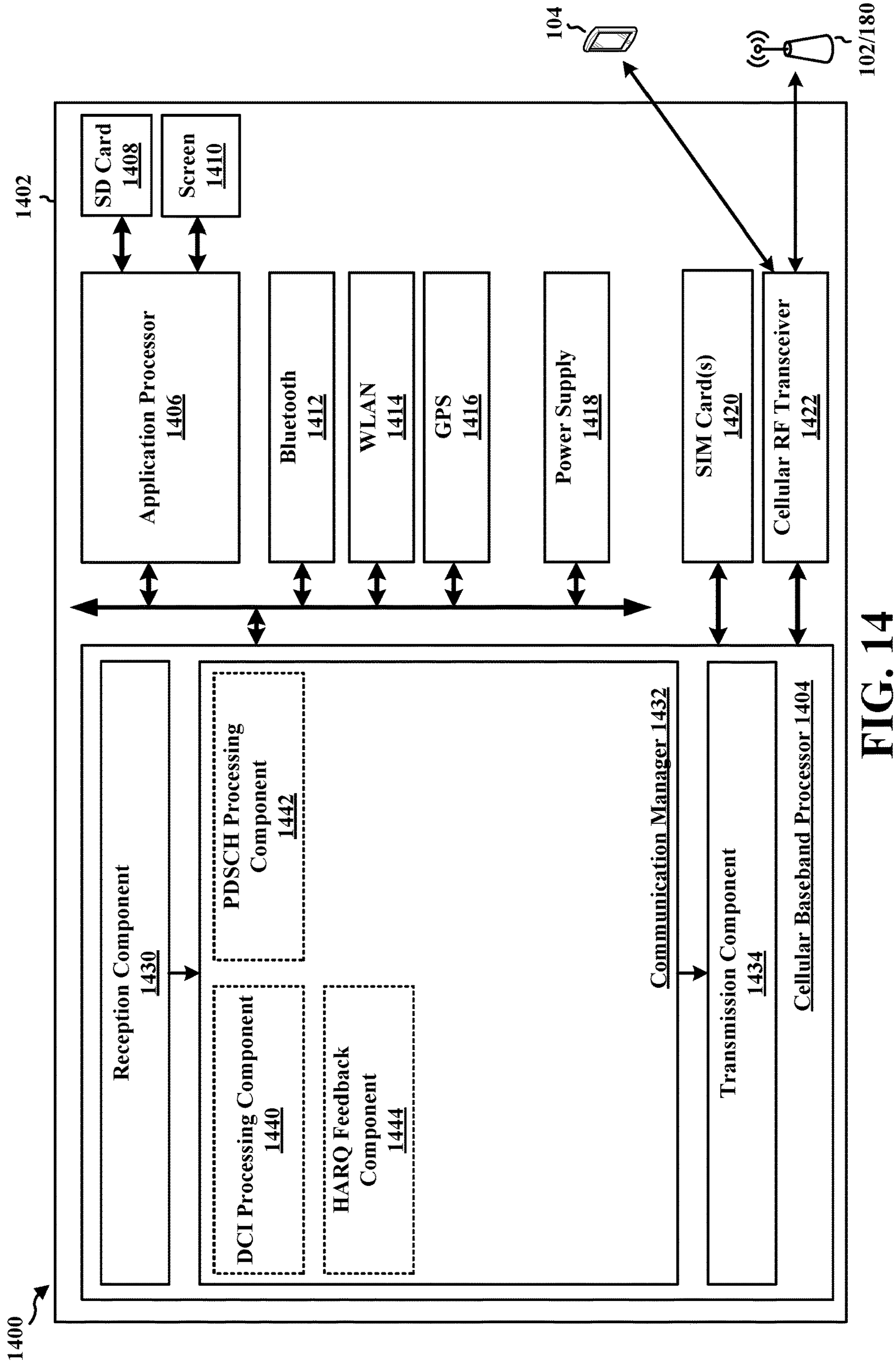
FIG. 14 is a diagram illustrating an example of a hardware implementation for an example apparatus.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the aforediscussed additional modules of the apparatus 1402.

The communication manager 1432 includes a DCI processing component 1440 that is configured to receive DCI scheduling a PDSCH to be received by a first plurality of panels and indicating a second plurality of PUCCH repetitions for providing ACK/NACK feedback, e.g., as described in connection with 1302 of FIG. 13. The communication manager 1432 further includes a PDSCH processing component 1442 that is configured to receive the PDSCH through the first plurality of panels, e.g., as described in connection with 1304 of FIG. 13. The communication manager 1432 further includes a HARQ feedback component 1444 that is configured to transmit ACK/NACK feedback in the indicated second plurality of PUCCH repetitions based on the received PDSCH, e.g., as described in connection with 1306 of FIG. 13.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for receiving DCI scheduling a PDSCH to be received by a first plurality of panels and indicating a second plurality of PUCCH repetitions for providing ACK/NACK feedback. The apparatus 1402 may include means for receiving the PDSCH through the first plurality of panels. The apparatus 1402 may include means for transmitting ACK/NACK feedback in the indicated second plurality of PUCCH repetitions based on the received PDSCH. The first plurality of panels may be co-located within the apparatus 1402, or one or more panels of the first plurality of panels may be located on a different apparatus. The panels may share a same panel ID or a group panel ID. The ACK/NACK feedback may be transmitted from each of first plurality of panels based on the PDSCH received in each of first plurality of panels.

In one configuration, each of the second plurality of PUCCH repetitions may be associated with one of the first plurality of panels, such that the apparatus 1402 may transmit the ACK/NACK feedback from each of the first plurality of panels in a PUCCH repetition that is associated with each panel.

In another configuration, each of the second plurality of PUCCH repetitions may be associated with a subset of panels within the first plurality of panels, such that the apparatus 1402 may transmit the ACK/NACK feedback from at least one of the subset of panels in a PUCCH repetition that is associated with the subset of panels. In such configuration, a first PUCCH repetition in the second plurality of PUCCH repetitions may be associated with a first subset of panels within the first plurality of panels and a second PUCCH repetition in the second plurality of PUCCH repetitions may be associated with a second subset of panels within the first plurality of panels. Then, the apparatus 1402 may transmit the ACK/NACK feedback from at least one of the first subset of panels in the first PUCCH repetition and from at least one of the second subset of panels in the second PUCCH repetition. In such configuration, the first subset of panels may be a subset of the second subset of panels.

In another configuration, the DCI may include an ACK/NACK feedback timing indicator, and each of the first plurality of panels may be associated with a panel-specific offset value. The ACK/NACK feedback timing indicator may include a single offset value ($K_1$), where the apparatus 1402 may transmit the ACK/NACK feedback based at least in part on the single offset value and the panel-specific offset value from at least one of the first plurality of panels.

In another configuration, the DCI may include an ACK/NACK feedback timing indicator that include a set of offset ($K_1$) values, and the apparatus 1402 may transmit the ACK/NACK feedback based at least in part on one of the offset values from at least one of the first plurality of panels.

In another configuration, the DCI may include a PUCCH resource indicator (PRI), and each of the first plurality of panels may be associated with a PUCCH resource set. In such configuration, the PRI may include a single PRI value, where the apparatus 1402 may transmit the ACK/NACK feedback using a resource from the PUCCH resource set that corresponds to the single PRI value. Alternatively, or additionally, the PM may include a set of PM values, where the apparatus 1402 may transmit the ACK/NACK feedback using a resource from the PUCCH resource set that corresponds to one of the PM values.

The aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
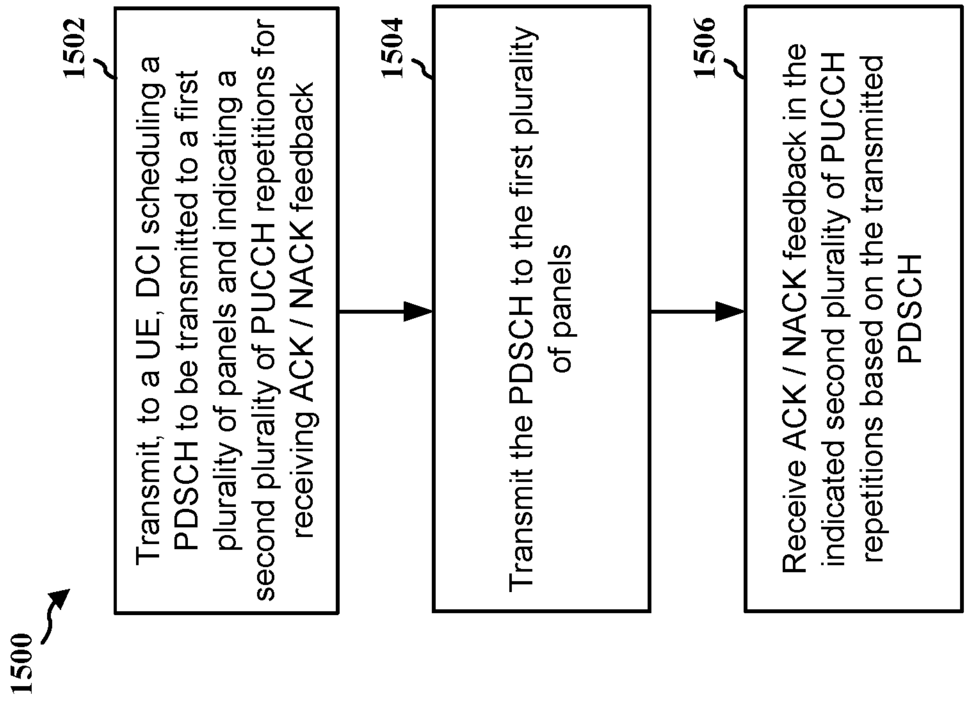
FIG. 15 is a flowchart of a method of wireless communication.

FIG. 15 is a flowchart 1500 of a method of wireless communication. The method may be performed by a base station (e.g., the base station 102/180, 504, 604, 704, 706, 804, 904, 1004, 1104, 1204; the apparatus 1602). The method may enable the base station to schedule data to be transmitted to and/or received from multiple panels (e.g., antenna panels) of one or more UEs, and to receive HARQ feedback from individual panels based on their PDSCH reception status (e.g., decoding result).

At 1502, the base station may transmit, to a UE, DCI scheduling a PDSCH to be transmitted to a first plurality of panels and indicating a second plurality of PUCCH repetitions for receiving ACK/NACK feedback, such as described in connection with FIGS. 8 to 12. For example, at 830, the base station 804 may transmit a DCI 816 to the UE 802, such as to one of the UE 802's antenna panels 808. The DCI 816 may schedule a PDSCH 818 to be transmitted to N antenna panels (e.g., 808, 810, 812, 814) of the UE 802. The DCI 816 may also schedule/indicate M PUCCH repetitions (e.g., 820, 822, 824, 826) for the N antenna panels to provide HARQ feedbacks for the PDSCH 818.

At 1504, the base station may transmit the PDSCH to the first plurality of panels, such as described in connection with FIGS. 8 to 12. For example, at 832, the base station 804 may transmit the PDSCH to antenna panels 808, 810, 812 and 814 of the UE 802. The first plurality of panels may be co-located within the UE, or one or more panels of the first plurality of panels may be located on a different UE. The panels may share a same panel ID or a group panel ID.

At 1506, the base station may receive ACK/NACK feedback in the indicated second plurality of PUCCH repetitions based on the transmitted PDSCH, such as described in connection with FIGS. 8 to 12. For example, at 834, the base station 804 may receive HARQ feedbacks in PUCCH repetitions 820, 822, 824 and 826 from the UE 802. The ACK/NACK feedback may be received from each of first plurality of panels based on the PDSCH transmitted to each of first plurality of panels.

In one example, each of the second plurality of PUCCH repetitions may be associated with one of the first plurality of panels, such that the base station may receive the ACK/NACK feedback from each of the first plurality of panels in a PUCCH repetition that is associated with each panel.

In another example, each of the second plurality of PUCCH repetitions may be associated with a subset of panels within the first plurality of panels, such that the base station may receive the ACK/NACK feedback from at least one of the subset of panels in a PUCCH repetition that is associated with the subset of panels. For example, a first PUCCH repetition in the second plurality of PUCCH repetitions may be associated with a first subset of panels within the first plurality of panels and a second PUCCH repetition in the second plurality of PUCCH repetitions may be associated with a second subset of panels within the first plurality of panels. Then, the base station may receive the ACK/NACK feedback from at least one of the first subset of panels in the first PUCCH repetition and from at least one of the second subset of panels in the second PUCCH repetition. In another example, the first subset of panels may be a subset of the second subset of panels.

In another example, the DCI may indicate an ACK/NACK feedback timing indicator, and each of the first plurality of panels may be associated with a panel-specific offset value. For example, the ACK/NACK feedback timing indicator may include a single offset value ($K_1$), where the base station may receive the ACK/NACK feedback based at least in part on the single offset value and the panel-specific offset value from at least one of the first plurality of panels.

In another example, the DCI may indicate an ACK/NACK feedback timing indicator that includes a set of offset ($K_1$) values, where the base station may receive the ACK/NACK feedback based at least in part on one of the offset values from at least one of the first plurality of panels.

In another example, the DCI may indicate a PUCCH resource indicator (PRI), and each of the first plurality of panels may be associated with a PUCCH resource set. For example, the PM may include a single PRI value, where the base station may receive the ACK/NACK feedback in a resource within the PUCCH resource set that corresponds to the single PRI value. Alternatively, or additionally, the PRI may include a set of PRI values, where the base station may receive the ACK/NACK feedback in a resource within the PUCCH resource set that corresponds to one of the PM values.

Figure 16:
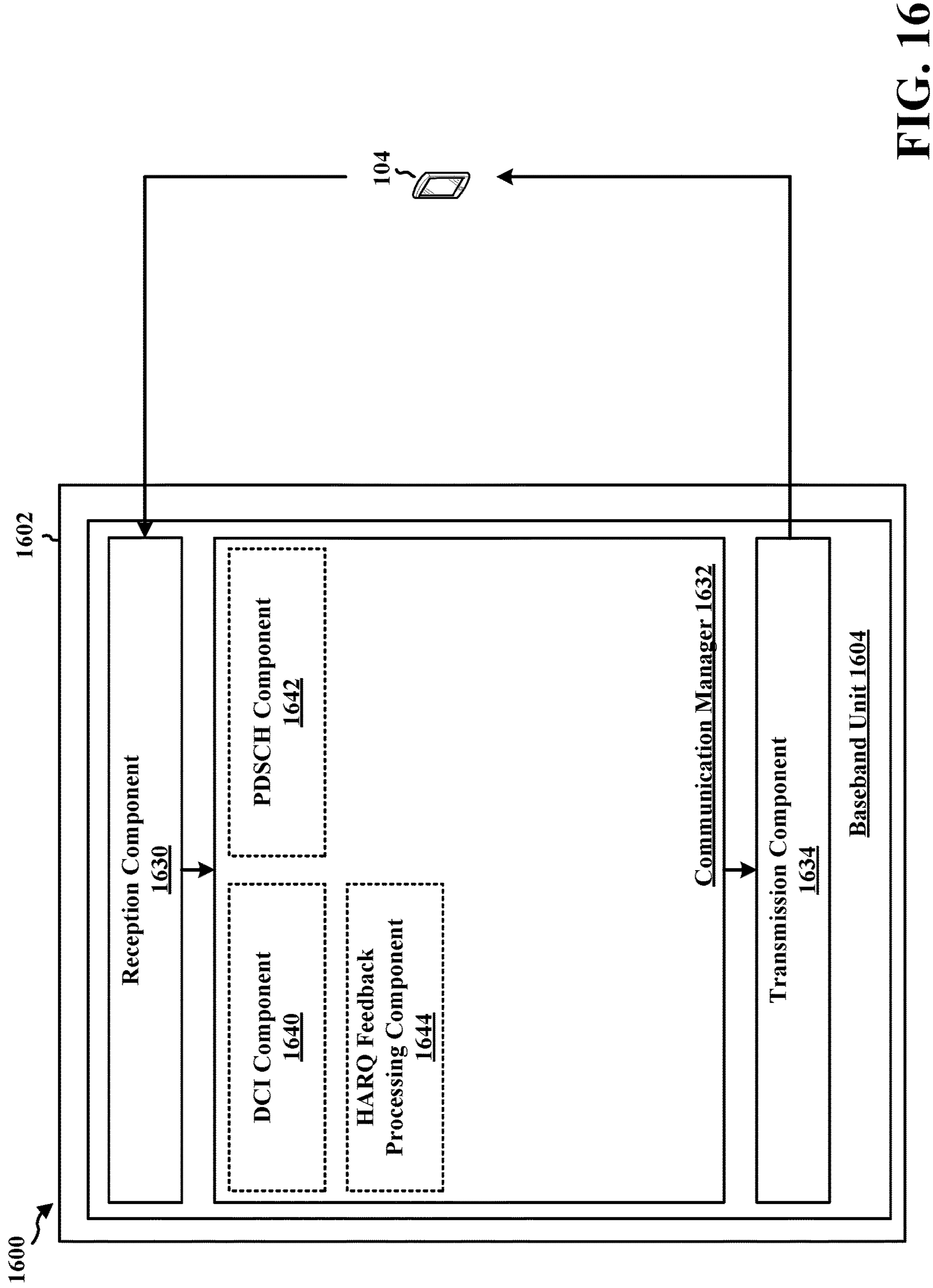
FIG. 16 is a diagram illustrating an example of a hardware implementation for an example apparatus.

FIG. 16 is a diagram 1600 illustrating an example of a hardware implementation for an apparatus 1602. The apparatus 1602 is a base station and includes a baseband unit 1604. The baseband unit 1604 may communicate through a cellular RF transceiver with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the BS 310 and may include the memory 376 and/or at least one of the TX processor 316, the RX processor 370, and the controller/processor 375.

The communication manager 1632 includes a DCI component 1640 that receives DCI scheduling a PDSCH to be received by a first plurality of panels and indicating a second plurality of PUCCH repetitions for providing ACK/NACK feedback, e.g., as described in connection with 1502 of FIG. 15. The communication manager 1632 further includes a PDSCH component 1642 that receives the PDSCH through the first plurality of panels, e.g., as described in connection with 1504 of FIG. 15. The communication manager 1632 further includes a HARQ feedback processing component 1644 that transmits ACK/NACK feedback in the indicated second plurality of PUCCH repetitions based on the received PDSCH, e.g., as described in connection with 1506 of FIG. 15.

The apparatus may include additional components that perform each of the blocks of the algorithm in the aforementioned flowchart of FIG. 15. As such, each block in the aforementioned flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband unit 1604, includes means for transmitting, to a UE, DCI scheduling a PDSCH to be transmitted to a first plurality of panels and indicating a second plurality of PUCCH repetitions for receiving ACK/NACK feedback. The apparatus 1602 includes means for transmitting the PDSCH to the first plurality of panels. The apparatus 1602 includes means for receiving ACK/NACK feedback in the indicated second plurality of PUCCH repetitions based on the transmitted PDSCH. The first plurality of panels may be co-located within the UE, or one or more panels of the first plurality of panels may be located on a different UE. The panels may share a same panel ID or a group panel ID. The ACK/NACK feedback may be received from each of first plurality of panels based on the PDSCH transmitted to each of first plurality of panels.

In one configuration, each of the second plurality of PUCCH repetitions may be associated with one of the first plurality of panels, such that the apparatus 1602 may receive the ACK/NACK feedback from each of the first plurality of panels in a PUCCH repetition that is associated with each panel.

In another configuration, each of the second plurality of PUCCH repetitions may be associated with a subset of panels within the first plurality of panels, such that the apparatus 1602 may receive the ACK/NACK feedback from at least one of the subset of panels in a PUCCH repetition that is associated with the subset of panels. In such configuration, a first PUCCH repetition in the second plurality of PUCCH repetitions may be associated with a first subset of panels within the first plurality of panels and a second PUCCH repetition in the second plurality of PUCCH repetitions may be associated with a second subset of panels within the first plurality of panels. In such configuration, the apparatus 1602 may receive the ACK/NACK feedback from at least one of the first subset of panels in the first PUCCH repetition and from at least one of the second subset of panels in the second PUCCH repetition. In such configuration, the first subset of panels may be a subset of the second subset of panels.

In another configuration, the DCI may indicate an ACK/NACK feedback timing indicator, and each of the first plurality of panels may be associated with a panel-specific offset value. In such configuration, the ACK/NACK feedback timing indicator may include a single offset value ($K_1$), where the apparatus 1602 may receive the ACK/NACK feedback based at least in part on the single offset value and the panel-specific offset value from at least one of the first plurality of panels.

In another configuration, the DCI may indicate an ACK/NACK feedback timing indicator that includes a set of offset ($K_1$) values, where the apparatus 1602 may receive the ACK/NACK feedback based at least in part on one of the offset values from at least one of the first plurality of panels.

In another configuration, the DCI may indicate a PUCCH resource indicator (PRI), and each of the first plurality of panels may be associated with a PUCCH resource set. In such configuration, the PRI may include a single PRI value, where the apparatus 1602 may receive the ACK/NACK feedback in a resource within the PUCCH resource set that corresponds to the single PRI value. Alternatively, or additionally, the PRI may include a set of PRI values, where the apparatus 1602 may receive the ACK/NACK feedback in a resource within the PUCCH resource set that corresponds to one of the PRI values.

The aforementioned means may be one or more of the aforementioned components of the apparatus 1602 configured to perform the functions recited by the aforementioned means. As described supra, the apparatus 1602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a UE, comprising: receiving DCI scheduling a PDSCH to be received by a first plurality of panels and indicating a second plurality of PUCCH repetitions for providing ACK/NACK feedback; receiving the PDSCH through the first plurality of panels; and transmitting ACK/NACK feedback in the indicated second plurality of PUCCH repetitions based on the received PDSCH.

In aspect 2, the method of aspect 1 further includes that one or more panels of the first plurality of panels are located on a different UE.

In aspect 3, the method of aspect 1 or aspect 2 further includes that the ACK/NACK feedback is transmitted from each of first plurality of panels based on the PDSCH received in each of first plurality of panels.

In aspect 4, the method of any of aspects 1-3 further includes that each of the second plurality of PUCCH repetitions is associated with one of the first plurality of panels.

In aspect 5, the method of any of aspects 1-4 further includes that the UE transmits the ACK/NACK feedback from each of the first plurality of panels in a PUCCH repetition that is associated with each panel.

In aspect 6, the method of any of aspects 1-3 further includes that each of the second plurality of PUCCH repetitions is associated with a subset of panels within the first plurality of panels.

In aspect 7, the method of any of aspects 1-3 and 6 further includes that the UE transmits the ACK/NACK feedback from at least one of the subset of panels in a PUCCH repetition that is associated with the subset of panels.

In aspect 8, the method of any of aspects 1-3 and 6-7 further includes that a first PUCCH repetition in the second plurality of PUCCH repetitions is associated with a first subset of panels within the first plurality of panels and a second PUCCH repetition in the second plurality of PUCCH repetitions is associated with a second subset of panels within the first plurality of panels.

In aspect 9, the method of any of aspects 1-3 and 6-8 further includes that the UE transmits the ACK/NACK feedback from at least one of the first subset of panels in the first PUCCH repetition and from at least one of the second subset of panels in the second PUCCH repetition.

In aspect 10, the method of any of aspects 1-3 and 6-9 further includes that the first subset of panels is a subset of the second subset of panels.

In aspect 11, the method of any of aspects 1-10 further includes that the DCI comprises an ACK/NACK feedback timing indicator.

In aspect 12, the method of any of aspects 1-11 further includes that each of the first plurality of panels is associated with a panel-specific offset value.

In aspect 13, the method of any of aspects 1-12 further includes that the ACK/NACK feedback timing indicator comprises a single offset value ($K_1$), and the UE transmits the ACK/NACK feedback based at least in part on the single offset value and the panel-specific offset value from at least one of the first plurality of panels.

In aspect 14, the method of any of aspects 1-13 further includes that the ACK/NACK feedback timing indicator comprises a set of offset ($K_1$) values, and the UE transmits the ACK/NACK feedback based at least in part on one of the offset values from at least one of the first plurality of panels.

In aspect 15, the method of any of aspects 1-14 further includes that the DCI comprises a PUCCH resource indicator (PRI).

In aspect 16, the method of any of aspects 1-15 further includes that each of the first plurality of panels is associated with a PUCCH resource set.

In aspect 17, the method of any of aspects 1-16 further includes that the PRI comprises a single PRI value, and the UE transmits the ACK/NACK feedback using a resource from the PUCCH resource set that corresponds to the single PRI value.

In aspect 18, the method of any of aspects 1-16 further includes that the PRI comprises a set of PRI values, and the UE transmits the ACK/NACK feedback using a resource from the PUCCH resource set that corresponds to one of the PRI values.

Aspect 19 is an apparatus for wireless communication including at least one processor coupled to a memory and configured to implement a method as in any of aspects 1 to 18.

Aspect 20 is an apparatus for wireless communication including means for implementing a method as in any of aspects 1 to 18.

Aspect 21 is a non-transitory computer-readable medium storing computer executable code, where the code when executed by a processor causes the processor to implement a method as in any of aspects 1 to 18.

Aspect 22 is a method of wireless communication of a base station, comprising: transmitting, to a UE, DCI scheduling a PDSCH to be transmitted to a first plurality of panels and indicating a second plurality of PUCCH repetitions for receiving ACK/NACK feedback; transmitting the PDSCH to the first plurality of panels; and receiving ACK/NACK feedback in the indicated second plurality of PUCCH repetitions based on the transmitted PDSCH.

In aspect 23, the method of aspect 22 further includes that one or more panels of the first plurality of panels are located on a different UE.

In aspect 24, the method of aspect 22 or aspect 23 further includes that the ACK/NACK feedback is received from each of first plurality of panels based on the PDSCH transmitted to each of first plurality of panels.

In aspect 25, the method of any of aspects 22-24 further includes that each of the second plurality of PUCCH repetitions is associated with one of the first plurality of panels.

In aspect 26, the method of any of aspects 22-25 further includes that the base station receives the ACK/NACK feedback from each of the first plurality of panels in a PUCCH repetition that is associated with each panel.

In aspect 27, the method of any of aspects 22-24 further includes that each of the second plurality of PUCCH repetitions is associated with a subset of panels within the first plurality of panels.

In aspect 28, the method of any of aspects 22-24 and 27 further includes that the base station receives the ACK/NACK feedback from at least one of the subset of panels in a PUCCH repetition that is associated with the subset of panels.

In aspect 29, the method of any of aspects 22-24 and 27-28 further includes that a first PUCCH repetition in the second plurality of PUCCH repetitions is associated with a first subset of panels within the first plurality of panels and a second PUCCH repetition in the second plurality of PUCCH repetitions is associated with a second subset of panels within the first plurality of panels.

In aspect 30, the method of any of aspects 22-24 and 27-29 further includes that the base station receives the ACK/NACK feedback from at least one of the first subset of panels in the first PUCCH repetition and from at least one of the second subset of panels in the second PUCCH repetition.

In aspect 31, the method of any of aspects 22-24 and 27-30 further includes that the first subset of panels is a subset of the second subset of panels.

In aspect 32, the method of any of aspects 22-31 further includes that the DCI further indicates an ACK/NACK feedback timing indicator.

In aspect 33, the method of any of aspects 22-32 further includes that each of the first plurality of panels is associated with a panel-specific offset value.

In aspect 34, the method of any of aspects 22-33 further includes that the ACK/NACK feedback timing indicator comprises a single offset value ($K_1$), and the base station receives the ACK/NACK feedback based at least in part on the single offset value and the panel-specific offset value from at least one of the first plurality of panels.

In aspect 35, the method of any of aspects 22-33 further includes that the ACK/NACK feedback timing indicator comprises a set of offset ($K_1$) values, and the base station receives the ACK/NACK feedback based at least in part on one of the offset values from at least one of the first plurality of panels.

In aspect 36, the method of any of aspects 22-35 further includes that the DCI further indicates a PUCCH resource indicator (PRI).

In aspect 37, the method of any of aspects 22-36 further includes that each of the first plurality of panels is associated with a PUCCH resource set.

In aspect 38, the method of any of aspects 22-37 further includes that the PRI comprises a single PRI value, and the base station receives the ACK/NACK feedback in a resource within the PUCCH resource set that corresponds to the single PRI value.

In aspect 39, the method of any of aspects 22-37 further includes that the PRI comprises a set of PRI values, and the base station receives the ACK/NACK feedback in a resource within the PUCCH resource set that corresponds to one of the PM values.

Aspect 40 is an apparatus for wireless communication including at least one processor coupled to a memory and configured to implement a method as in any of aspects 22 to 38.

Aspect 41 is an apparatus for wireless communication including means for implementing a method as in any of aspects 22 to 38.

Aspect 42 is anon-transitory computer-readable medium storing computer executable code, where the code when executed by a processor causes the processor to implement a method as in any of aspects 22 to 38.

What is claimed is:

1. A method of wireless communication of a user equipment (UE), comprising:

receiving downlink control information (DCI) scheduling a physical downlink shared channel (PDSCH) to be received by a plurality of panels and indicating a plurality of physical uplink control channel (PUCCH) repetitions for providing acknowledgment (ACK)/negative ACK (NACK) feedback, wherein the DCI comprises an ACK/NACK feedback timing indicator that includes a single offset value ($K_1$), wherein each of the plurality of panels is associated with a panel-specific offset value;

receiving the PDSCH through the plurality of panels; and transmitting ACK/NACK feedback in the indicated plurality of PUCCH repetitions based on (1) the received PDSCH, (2) the single offset value ($K_1$), and (3) the panel-specific offset value from at least one of the plurality of panels.

2. The method of claim 1, wherein transmitting the ACK/NACK feedback comprises transmitting ACK/NACK feedback from each of the plurality of panels based on the PDSCH received in each of the plurality of panels.

3. The method of claim 1, wherein each of the plurality of PUCCH repetitions is associated with one of the plurality of panels.

4. The method of claim 3, wherein transmitting the ACK/NACK feedback comprises transmitting the ACK/NACK feedback from each of the plurality of panels in a PUCCH repetition that is associated with each panel.

5. The method of claim 1, wherein each of the plurality of PUCCH repetitions is associated with a subset of panels within the plurality of panels.

6. The method of claim 5, wherein transmitting the ACK/NACK feedback comprises transmitting the ACK/NACK feedback from at least one of the subset of panels in a PUCCH repetition that is associated with the subset of panels.

7. The method of claim 5, wherein a first PUCCH repetition in the plurality of PUCCH repetitions is associated with a first subset of panels within the plurality of panels and a second PUCCH repetition in the plurality of PUCCH repetitions is associated with a second subset of panels within the plurality of panels.

8. The method of claim 7, wherein transmitting the ACK/NACK feedback comprises transmitting the ACK/NACK feedback from at least one of the first subset of panels in the first PUCCH repetition and from at least one of the second subset of panels in the second PUCCH repetition.

9. The method of claim 7, wherein the first subset of panels is a subset of the second subset of panels.

10. The method of claim 1, wherein the DCI comprises a PUCCH resource indicator (PRI).

11. The method of claim 10, wherein each of the plurality of panels is associated with a PUCCH resource set.

12. The method of claim 11, wherein the PRI comprises a single PRI value, and wherein transmitting the ACK/NACK feedback comprises transmitting the ACK/NACK feedback using a resource from the PUCCH resource set that corresponds to the single PRI value.

13. The method of claim 11, wherein the PRI comprises a set of PRI values, and wherein transmitting the ACK/NACK feedback comprises transmitting the ACK/NACK feedback using a resource from the PUCCH resource set that corresponds to one of the PRI values.

14. The method of claim 1, wherein one or more panels of the plurality of panels are located on a different UE.

15. An apparatus for wireless communication of a user equipment (UE), comprising:

at least one memory; and at least one processor coupled to the at least one memory and configured to:

receive downlink control information (DCI) scheduling a physical downlink shared channel (PDSCH) to be received by a plurality of panels and indicating a plurality of physical uplink control channel (PUCCH) repetitions for providing acknowledgment (ACK)/negative ACK (NACK) feedback, wherein the DCI comprises an ACK/NACK feedback timing indicator that includes a single offset value ($K_1$), wherein each of the plurality of panels is associated with a panel-specific offset value;

receive the PDSCH through the plurality of panels; and transmit ACK/NACK feedback in the indicated plurality of PUCCH repetitions based on (1) the received PDSCH, (2) the single offset value ($K_1$), and (3) the panel-specific offset value from at least one of the plurality of panels.

16. A method of wireless communication of a base station, comprising:

transmitting, to a user equipment (UE), downlink control information (DCI) scheduling a physical downlink shared channel (PDSCH) to be transmitted to a plurality of panels and indicating a plurality of physical uplink control channel (PUCCH) repetitions for receiving acknowledgment (ACK)/negative ACK (NACK) feedback, wherein the DCI comprises an ACK/NACK feedback timing indicator that includes a single offset value ($K_1$), wherein each of the plurality of panels is associated with a panel-specific offset value;

transmitting the PDSCH to the plurality of panels; and receiving ACK/NACK feedback in the indicated plurality of PUCCH repetitions based on (1) the transmitted PDSCH, (2) the single offset value ($K_1$), and (3) the panel-specific offset value from at least one of the plurality of panels.

17. The method of claim 16, wherein receiving the ACK/NACK feedback comprises receiving the ACK/NACK feedback from each of plurality of panels based on the PDSCH transmitted to each of plurality of panels.

18. The method of claim 16, wherein each of the plurality of PUCCH repetitions is associated with one of the plurality of panels.

19. The method of claim 18, wherein receiving the ACK/NACK feedback comprises receiving the ACK/NACK feedback from each of the plurality of panels in a PUCCH repetition that is associated with each panel.

20. The method of claim 16, wherein each of the plurality of PUCCH repetitions is associated with a subset of panels within the plurality of panels.

21. The method of claim 20, wherein receiving the ACK/NACK feedback comprises receiving the ACK/NACK feedback from at least one of the subset of panels in a PUCCH repetition that is associated with the subset of panels.

22. The method of claim 16, wherein the DCI further indicates a PUCCH resource indicator (PRI) and each of the plurality of panels is associated with a PUCCH resource set.

23. The method of claim 22, wherein the PRI comprises a single PRI value or a set of PRI values, and wherein receiving the ACK/NACK feedback comprises receiving the ACK/NACK feedback in a resource within the PUCCH resource set that corresponds to the single PRI value or one of the PRI values.

24. The method of claim 16, wherein one or more panels of the plurality of panels are located on a second UE.

25. An apparatus for wireless communication of a base station, comprising:

at least one memory; and at least one processor coupled to the at least one memory and configured to:

transmit, to a user equipment (UE), downlink control information (DCI) scheduling a physical downlink shared channel (PDSCH) to be transmitted to a plurality of panels and indicating a plurality of physical uplink control channel (PUCCH) repetitions for receiving acknowledgment (ACK)/negative ACK (NACK) feedback, wherein the DCI comprises an ACK/NACK feedback timing indicator that includes a single offset value ($K_1$), wherein each of the plurality of panels is associated with a panel-specific offset value;

transmit the PDSCH to the plurality of panels; and receive ACK/NACK feedback in the indicated plurality of PUCCH repetitions based on (1) the transmitted PDSCH, (2) the single offset value ($K_1$), and (3) the panel-specific offset value from at least one of the plurality of panels.

* * * * *